(12) United States Patent
Maamoun

(10) Patent No.: US 9,686,599 B2
(45) Date of Patent: Jun. 20, 2017

(54) MINIMAL SPECTRUM OCCUPANCY SYSTEMS AND METHODS FOR ROUTING AND WAVELENGTH OR SPECTRUM ASSIGNMENT IN OPTICAL NETWORKS

(71) Applicant: Ciena Corporation, Hanover, MD (US)

(72) Inventor: Khaled Maamoun, Ottawa (CA)

(73) Assignee: Ciena Corporation, Hanover, MD (US)

(*) Notice: Subject to any disclaimer, the term of this patent is extended or adjusted under 35 U.S.C. 154(b) by 0 days.

(21) Appl. No.: 14/944,528

(22) Filed: Nov. 18, 2015

(65) Prior Publication Data

US 2017/0142505 A1    May 18, 2017

(51) Int. Cl.
*H04J 14/02* (2006.01)
*H04Q 11/00* (2006.01)
*H04L 12/24* (2006.01)

(52) U.S. Cl.
CPC ..... *H04Q 11/0066* (2013.01); *H04L 41/0896* (2013.01); *H04Q 2011/0016* (2013.01); *H04Q 2011/0077* (2013.01); *H04Q 2011/0086* (2013.01)

(58) Field of Classification Search
CPC .................. H04J 14/0241; H04Q 11/0066
See application file for complete search history.

(56) References Cited

U.S. PATENT DOCUMENTS

| | | | |
|---|---|---|---|
| 8,682,160 B2 | 3/2014 | Prakash et al. | |
| 8,693,871 B2 | 4/2014 | Resende et al. | |
| 8,781,328 B2 | 7/2014 | Patel et al. | |
| 8,854,997 B2 | 10/2014 | Clow et al. | |
| 8,909,043 B2 | 12/2014 | Patel et al. | |
| 8,977,123 B2 | 3/2015 | Patel et al. | |
| 2002/0118415 A1* | 8/2002 | Dasylva | H04J 14/02 398/48 |
| 2004/0153492 A1* | 8/2004 | Cao | H04J 14/0212 709/200 |
| 2013/0216224 A1 | 8/2013 | Patel et al. | |
| 2013/0266316 A1 | 10/2013 | Xia et al. | |
| 2014/0099118 A1 | 4/2014 | Zhang et al. | |
| 2014/0147120 A1* | 5/2014 | Patel | H04J 14/0257 398/79 |
| 2014/0334817 A1 | 11/2014 | Miedema | |
| 2014/0341572 A1 | 11/2014 | Sambo et al. | |
| 2016/0072608 A1* | 3/2016 | Wright | H04J 14/0241 398/49 |

OTHER PUBLICATIONS

"A simple scheme for routing and wavelength assignment in WDM networks", ResearchGate, Conference Paper Jan. 2008, pp. 1-5.

(Continued)

*Primary Examiner* — Dzung Tran
(74) *Attorney, Agent, or Firm* — Clements Bernard Walker PLLC; Christopher L. Bernard; Lawrence A. Baratta, Jr.

(57) ABSTRACT

Systems and methods for determining minimal spectrum occupancy in routing and wavelength/spectrum assignment (RWA/RSA) in an optical network include performing, for a new demand request, a set of binary operations using a binary representation for each wavelength or portion of spectrum over all links in the optical network; and selecting, based on the set of binary operations, i) a route and ii) one of a) a wavelength and b) one or more portions of spectrum for the new demand request.

20 Claims, 24 Drawing Sheets

(56) References Cited

OTHER PUBLICATIONS

Christodoulopoulos et al., "Static and Dynamic Spectrum Allocation in Flexi-grid Optical Networks", ICTON 2012, pp. 1-5.
Varvarigos, "An introduction to routing and wavelength assignment algorithms for fixed and flexgrid", Computer Engineering and Informatics Department, University of Patras, and Computer Technology Institute & Press "DIOPHANTUS", Patra, Greece, OFC 2013, slides 1-52.
Vizcaino et al., "Protection in optical transport networks with fixed and flexible grid: Cost and energy efficiency evaluation", Elsevier, Optical Switching and Networking 11 (2014), pp. 55-71.
"Spectral grids for WDM applications: DWDM frequency grid", International Telecommunication Union, Feb. 2012, pp. 1-16.

\* cited by examiner

|    | 1  | 2  | 3  | 4  | 5  | 6  | 7  | 8  | 9  | 10 | 11 | 12 | Decimal | # of bits |
|----|----|----|----|----|----|----|----|----|----|----|----|----|---------|-----------|
| 1  | 0  | 5  |    |    |    |    |    |    |    |    |    |    | 256     | 8         |
| 2  | 0  | 10 | 11 | 5  |    |    |    |    |    |    |    |    | 100     | 7         |
| 3  | 0  | 1  | 10 | 11 | 5  |    |    |    |    |    |    |    | 166     | 7         |
| 4  | 0  | 1  | 3  | 4  | 5  |    |    |    |    |    |    |    | 529410  | 19        |
| 5  | 0  | 10 | 1  | 3  | 4  | 5  |    |    |    |    |    |    | 529800  | 19        |
| 6  | 0  | 1  | 3  | 2  | 9  | 7  | 5  |    |    |    |    |    | 616450  | 19        |
| 7  | 0  | 10 | 1  | 3  | 2  | 9  | 7  | 5  |    |    |    |    | 616640  | 19        |
| 8  | 0  | 10 | 11 | 8  | 12 | 6  | 7  | 5  |    |    |    |    | 1318897 | 20        |
| 9  | 0  | 1  | 3  | 2  | 9  | 7  | 14 | 5  |    |    |    |    | 773098  | 20        |
| 10 | 0  | 1  | 10 | 11 | 8  | 12 | 6  | 7  | 5  |    |    |    | 1318083 | 20        |
| 11 | 0  | 10 | 1  | 3  | 2  | 9  | 7  | 14 | 5  |    |    |    | 772288  | 20        |
| 12 | 0  | 10 | 11 | 8  | 12 | 6  | 7  | 14 | 5  |    |    |    | 1474649 | 20        |
| 13 | 0  | 10 | 11 | 8  | 12 | 13 | 9  | 7  | 5  |    |    |    | 1132893 | 20        |
| 14 | 0  | 1  | 3  | 2  | 9  | 13 | 12 | 6  | 7  | 5  |    |    | 813894  | 20        |
| 15 | 0  | 1  | 3  | 2  | 9  | 13 | 12 | 8  | 11 | 5  |    |    | 1991852 | 21        |
| 16 | 0  | 1  | 10 | 11 | 8  | 12 | 6  | 7  | 14 | 5  |    |    | 1474711 | 20        |
| 17 | 0  | 1  | 10 | 11 | 8  | 12 | 13 | 9  | 7  | 5  |    |    | 1132959 | 20        |
| 18 | 0  | 10 | 11 | 8  | 12 | 13 | 9  | 7  | 14 | 5  |    |    | 1278541 | 20        |
| 19 | 0  | 1  | 3  | 2  | 9  | 7  | 6  | 12 | 8  | 11 | 5  |    | 1919027 | 21        |
| 20 | 0  | 10 | 1  | 3  | 2  | 9  | 13 | 12 | 6  | 7  | 5  |    | 813784  | 20        |
| 21 | 0  | 10 | 1  | 3  | 2  | 9  | 13 | 12 | 8  | 11 | 5  |    | 1593042 | 21        |
| 22 | 0  | 1  | 3  | 2  | 9  | 13 | 12 | 6  | 7  | 14 | 5  |    | 968242  | 20        |
| 23 | 0  | 10 | 11 | 8  | 12 | 13 | 9  | 2  | 3  | 4  | 5  |    | 1072717 | 20        |
| 24 | 0  | 1  | 10 | 11 | 8  | 12 | 13 | 9  | 7  | 14 | 5  |    | 1278607 | 20        |
| 25 | 0  | 1  | 10 | 11 | 8  | 12 | 13 | 9  | 2  | 3  | 4  | 5  | 1092783 | 20        |
| 26 | 0  | 10 | 1  | 3  | 2  | 9  | 7  | 6  | 12 | 8  | 11 | 5  | 1919217 | 21        |
| 27 | 0  | 10 | 1  | 3  | 2  | 9  | 13 | 12 | 6  | 7  | 14 | 5  | 969432  | 20        |
| 28 | 0  | 10 | 11 | 8  | 12 | 6  | 7  | 9  | 2  | 3  | 4  | 5  | 1399899 | 20        |
| 29 | 0  | 1  | 10 | 11 | 8  | 12 | 6  | 7  | 9  | 2  | 3  | 4  5 | 1399959 | 20        |
|    |    |    |    |    |    |    |    |    |    |    |    |    | 2097153 | 21        |

FIG. 10

| Service # | From | To | Service # | From | To |
|---|---|---|---|---|---|
| 1 | 0 | 5 | 53 | 6 | 0 |
| 2 | 0 | 12 | 54 | 6 | 11 |
| 3 | 1 | 10 | 55 | 6 | 11 |
| 4 | 1 | 10 | 56 | 6 | 7 |
| 5 | 1 | 10 | 57 | 6 | 7 |
| 6 | 1 | 5 | 58 | 6 | 7 |
| 7 | 1 | 5 | 59 | 7 | 5 |
| 8 | 1 | 5 | 60 | 7 | 5 |
| 9 | 1 | 5 | 61 | 7 | 14 |
| 10 | 1 | 5 | 62 | 7 | 14 |
| 11 | 1 | 5 | 63 | 7 | 13 |
| 12 | 1 | 5 | 64 | 7 | 13 |
| 13 | 1 | 8 | 65 | 8 | 12 |
| 14 | 1 | 4 | 66 | 8 | 10 |
| 15 | 1 | 4 | 67 | 8 | 11 |
| 16 | 1 | 4 | 68 | 8 | 7 |
| 17 | 2 | 5 | 69 | 9 | 5 |
| 18 | 2 | 5 | 70 | 9 | 5 |
| 19 | 2 | 5 | 71 | 9 | 5 |
| 20 | 2 | 5 | 72 | 9 | 5 |
| 21 | 2 | 5 | 73 | 9 | 0 |
| 22 | 2 | 4 | 74 | 9 | 0 |
| 23 | 2 | 7 | 75 | 9 | 12 |
| 24 | 2 | 7 | 76 | 9 | 12 |
| 25 | 2 | 7 | 77 | 9 | 11 |
| 26 | 2 | 1 | 78 | 10 | 5 |
| 27 | 2 | 10 | 79 | 10 | 5 |
| 28 | 2 | 6 | 80 | 10 | 7 |
| 29 | 2 | 8 | 81 | 10 | 7 |
| 30 | 2 | 11 | 82 | 10 | 12 |
| 31 | 3 | 5 | 83 | 11 | 5 |
| 32 | 3 | 5 | 84 | 11 | 5 |
| 33 | 3 | 5 | 85 | 11 | 7 |
| 34 | 3 | 5 | 86 | 11 | 12 |
| 35 | 3 | 9 | 87 | 11 | 0 |
| 36 | 3 | 14 | 88 | 12 | 0 |
| 37 | 3 | 12 | 89 | 12 | 0 |
| 38 | 3 | 0 | 90 | 12 | 7 |
| 39 | 3 | 0 | 91 | 12 | 7 |
| 40 | 3 | 0 | 92 | 12 | 5 |
| 41 | 3 | 7 | 93 | 13 | 5 |
| 42 | 4 | 5 | 94 | 13 | 5 |
| 43 | 4 | 5 | 95 | 13 | 0 |
| 44 | 4 | 5 | 96 | 13 | 12 |
| 45 | 4 | 7 | 97 | 14 | 5 |
| 46 | 4 | 0 | 98 | 14 | 5 |
| 47 | 4 | 0 | 99 | 14 | 5 |
| 48 | 5 | 7 | 100 | 14 | 0 |
| 49 | 5 | 7 | 101 | 14 | 7 |
| 50 | 5 | 7 | 102 | 14 | 12 |
| 51 | 5 | 14 | 103 | 14 | 12 |
| 52 | 6 | 5 | | | |

FIG. 11

MINIMAL SPECTRUM OCCUPANCY SYSTEMS AND METHODS FOR ROUTING AND WAVELENGTH OR SPECTRUM ASSIGNMENT IN OPTICAL NETWORKS

FIELD OF THE DISCLOSURE

The present disclosure generally relates to optical networking systems and methods. More particularly, the present disclosure relates to minimal spectrum occupancy systems and methods for Routing and Wavelength Assignment (RWA) for fixed grid optical networks and Routing and Spectrum Assignment (RSA) for flexible grid optical networks.

BACKGROUND OF THE DISCLOSURE

Routing and Wavelength Assignment (RWA) is a well-known problem for fixed grid optical networks while Routing and Spectrum Assignment (RSA) is its equivalent term to the same problem for flexible grid optical networks. In fixed grid optical networks, wavelengths are spaced apart from each other according to a wavelength spectrum grid defined by International Telecommunication Union (ITU) in ITU-T G.694.1 (February 2012), "Spectral grids for WDM applications: DWDM frequency grid," the contents of which are incorporated by reference. In flexible grid optical networks, which is also described in ITU Recommendation G.694.1 "Spectral grids for WDM applications: DWDM frequency grid" (February 2012), each signal can be allocated to spectrum with different widths optimized for the bandwidth requirements of the particular bit rate and modulation scheme of the individual channels. The ultimate objective of RWA or RSA is to find a wavelength or spectrum assignment on a route for a particular channel in the optical network, such assignment and routing being optimal in some manner.

Most conventional approaches to RWA deal with routing and wavelength assignment as two sub-problems. The majority of routing solutions is constrained-shortest-path while wavelength assignment is done by simple random-fit or first-fit techniques. There are various adequate solutions to RWA in the fixed grid domain; however, there is none or few complete solutions for RSA in the flexible grid domain. At present, the research for RSA in the flexible grid domain is still focused on the problem description or special case solution without describing a complete algorithm or technique to solve ultimately RSA. Without adequate RSA techniques, the transition from the fixed grid to the flexible grid is expected to be slow and difficult despite the benefits of the flexible grid.

Recalling that the conventional approaches solve routing and wavelength assignment as two problems, namely routing first and then wavelength assignment secondly. Disadvantageously, the resulting solution may not be globally optimal, since another route may need to be chosen as a result of the wavelength assignment analysis. Traditional searching techniques for a paired solution of both the routing and wavelength assignment sub-problems are very exhaustive, time-consuming, and suffer from computational complexity. Using optimization search engines is an expensive solution, adds another layer of complexity, and its solution may not be feasible until relaxing some constraints of the target functions.

BRIEF SUMMARY OF THE DISCLOSURE

In an exemplary embodiment, a method for determining minimal spectrum occupancy in routing and wavelength/spectrum assignment (RWA/RSA) in an optical network includes performing, for a new demand request, a set of binary operations using a binary representation for each wavelength or portion of spectrum over all links in the optical network; and selecting, based on the set of binary operations, i) a route and ii) one of a) a wavelength and b) one or more portions of spectrum for the new demand request. The set of binary operations can be performed between the binary representation for each wavelength or portion of spectrum and an associated binary representation for each possible route in the network for the new demand request. The set of binary operations can include i) a bitwise AND to determine if a particular route for the new demand can be assigned to a particular wavelength or portion of spectrum, ii) a bitwise XNOR to distinguish each of the wavelength or portion of spectrum from one another, and iii) a bitwise OR between a selected route and a selected wavelength or portion of spectrum to update the binary representation. The set of binary operations can be performed on all possible routes from every pair of source-destination of the new demand request to generate a table of results to select a best route according to a particular strategy. The binary representation can represent the links in one axis and spectrum slots in another axis, wherein the spectrum slots can include wavelengths for fixed grid spacing and portions of spectrum for flexible grid spacing. The links can utilize flexible grid spacing, and wherein the set of binary operations can be performed using a sliding windows based on a size of the new demand request. The route and the one of the wavelength and the one or more portions of spectrum can be selected simultaneously for the new demand request.

In another exemplary embodiment, an apparatus adapted to determine minimal spectrum occupancy in routing and wavelength/spectrum assignment (RWA/RSA) in an optical network includes circuitry adapted to perform, for a new demand request, a set of binary operations using a binary representation for each wavelength or portion of spectrum over all links in the optical network, and circuitry adapted to select, based on the set of binary operations, i) a route and ii) one of a) a wavelength and b) one or more portions of spectrum for the new demand request. The set of binary operations can be performed between the binary representation for each wavelength or portion of spectrum and an associated binary representation for each possible route in the network for the new demand request. The set of binary operations can include i) a bitwise AND to determine if a particular route for the new demand can be assigned to a particular wavelength or portion of spectrum, ii) a bitwise XNOR to distinguish each of the wavelength or portion of spectrum from one another, and iii) a bitwise OR between a selected route and a selected wavelength or portion of spectrum to update the binary representation. The set of binary operations can be performed on all possible routes from every pair of source-destination of the new demand request to generate a table of results to select a best route according to a particular strategy. The binary representation can represent the links in one axis and spectrum slots in another axis, wherein the spectrum slots can include wavelengths for fixed grid spacing and portions of spectrum for flexible grid spacing. The links can utilize flexible grid spacing, and wherein the set of binary operations can be performed using a sliding windows based on a size of the new demand request. The route and the one of the wavelength and the one or more portions of spectrum can be selected simultaneously for the new demand request.

In a further exemplary embodiment, a system adapted to determine minimal spectrum occupancy in routing and wavelength/spectrum assignment (RWA/RSA) in an optical network includes a processor; and memory storing instructions that, when executed, cause the processor to perform, for a new demand request, a set of binary operations using a binary representation for each wavelength or portion of spectrum over all links in the optical network, and select, based on the set of binary operations, i) a route and ii) one of a) a wavelength and b) one or more portions of spectrum for the new demand request. The set of binary operations can be performed between the binary representation for each wavelength or portion of spectrum and an associated binary representation for each possible route in the network for the new demand request. The set of binary operations can include i) a bitwise AND to determine if a particular route for the new demand can be assigned to a particular wavelength or portion of spectrum, ii) a bitwise XNOR to distinguish each of the wavelength or portion of spectrum from one another, and iii) a bitwise OR between a selected route and a selected wavelength or portion of spectrum to update the binary representation. The set of binary operations can be performed on all possible routes from every pair of source-destination of the new demand request to generate a table of results to select a best route according to a particular strategy. The binary representation can represent the links in one axis and spectrum slots in another axis, wherein the spectrum slots can include wavelengths for fixed grid spacing and portions of spectrum for flexible grid spacing. The links can utilize flexible grid spacing, and wherein the set of binary operations can be performed using a sliding windows based on a size of the new demand request.

BRIEF DESCRIPTION OF THE DRAWINGS

The present disclosure is illustrated and described herein with reference to the various drawings, in which like reference numbers are used to denote like system components/method steps, as appropriate, and in which:

FIG. 4 is a table of a binary representation of the checkerboard representation from FIG. 2A;

FIG. 7 is tables of an exemplary operation of the set of bit operations;

FIG. 10 is a table of all possible routes between two nodes in the network of FIG. 9;

FIG. 11 is a table of 103 services which are added in the network of FIG. 9 using the process of FIG. 5;

DETAILED DESCRIPTION OF THE DISCLOSURE

Again, in various exemplary embodiments, the present disclosure relates to minimal spectrum occupancy systems and methods for Routing and Wavelength Assignment (RWA) for fixed grid optical networks and Routing and Spectrum Assignment (RSA) for flexible grid optical networks. The systems and methods use a unique and different approach than any other traditional techniques of solving both routing and spectrum slots assignment. The systems and methods jointly solve the two RSA sub-problems; routing and spectrum slots assignment, by searching for all the possible combined solutions for every service request received in an optical network. Advantageously, the search is done by using simple Boolean operations.

The spectrum of an optical network with its associated link usage can be represented as a checkerboard of binary numbers that contains ones and zeroes. From this perspective, the spectrum of any arbitrary route also is represented by binary number or block of binary numbers. As the target spectrum can also be presented the same, so, by using Boolean algebra between the selected routes, one can achieve any target solution. These selected routes have been selected from all possible and available routes, so the solution can be considered as an optimal route among all possible solutions. The optimization search does not need a separate engine; instead, simple Boolean operations can be used which minimizes the running time and the complexity of the systems and methods. The systems and methods have the objective of the minimum spectrum occupancy using the least number of spectrum slots. The systems and methods optimize the optical networks' resources to have the best spectrum efficiency and to minimize the blocking probability.

Again, the systems and methods use Boolean operations to the transformed binary spectrum which lead to simple, fast and efficient application programming. The systems and methods can be used for either RWA or RSA. Note, the systems and methods provide an approach to solving RSA. The systems and methods differ from traditional techniques that are either using optimization engine or heuristics to the two sub-problems. Furthermore, the systems and methods not only provide significantly quicker and more efficient optimization, in exemplary implementations, on average, 11% spectral efficiency enhancement can be achieved compared to the best known other techniques. The analysis is done on the target spectrum with no constraint on the inputs in terms of the selected routes. The route search can be a continuous loop back process which produces an optimal result.

Exemplary Optical Network

Figure 1:
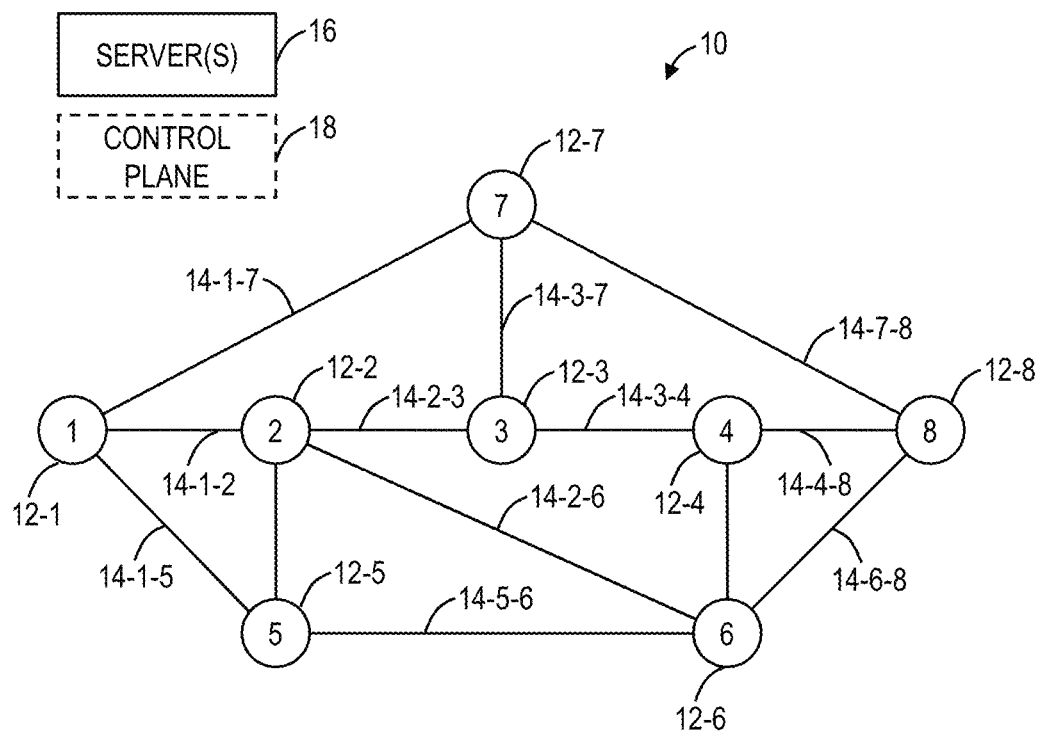
FIG. 1 is a connection diagram of a network for illustration of minimal spectrum occupancy systems and methods.

Referring to FIG. 1, in an exemplary embodiment, a network diagram illustrates a network 10. The network 10 includes nodes 12, labeled as nodes 12-1-12-8, interconnected to one another via links 14 which physically can include one or more optical fibers. The nodes 12 can be also referred to as network elements and can include, without limitation, Wavelength Division Multiplex (WDM) terminals, Dense WDM (DWDM) terminals, Optical Add/Drop Multiplexers (OADMs), Reconfigurable OADMs (ROADMs), optical cross connects, optical switches, Packet-Optical Transport Systems (POTS), and the like. In various exemplary embodiments, the nodes 12 include various hardware and software to communicate with one another via wavelengths, timeslots, packets, etc. At a physical layer, the nodes 12 provide one or more wavelengths between one another over the links 14. Note, while FIG. 1 shows a single node 12 at each location, there can be multiple devices or network elements providing multiple wavelengths.

For illustration purposes, each of the links is labeled as link 14-X-Y where X and Y are the nodes interconnected by the links 14. The links 14 utilize spectrum governed by ITU-T G.694.1 (February 2012) for both fixed and flexible. The purpose of RWA/RSA is to assign optimally wavelengths or spectrums across the links 14 in a manner that minimizes chances of blocking in the network 10. Blocking means that a particular wavelength or spectrum is unavailable on one or more links, preventing a connection. Stated different, RWA/RSA answers the question of which wavelength or spectrum should be assigned to a particular A-Z connection in the network 10 in a manner that minimizes the chance of blocking.

The network 10 can also include one or more servers 16 and/or a control plane 18. The servers 16 can include or operate as, for example, a Software Defined Networking (SDN) controller, an SDN application, a Network Management System (NMS), an Element Management System (EMS), a planning tool, a Path Computation Element (PCE), etc. The control plane 18 provides an automatic allocation of network resources in an end-to-end manner. Exemplary control planes may include Automatically Switched Optical Network (ASON) as defined in ITU-T G.8080/Y.1304, Architecture for the automatically switched optical network (ASON) (February 2012), the contents of which are herein incorporated by reference; Generalized Multi-Protocol Label Switching (GMPLS) Architecture as defined in IETF Request for Comments (RFC): 3945 (October 2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing connections. That is, the control plane 18 is configured to establish end-to-end signaled connections to route the connections and program the underlying hardware accordingly. SDN provides the management of network services through abstraction of lower-level functionality. This is done by decoupling the system that makes decisions about where traffic is sent (the control plane) from the underlying systems that forward traffic to the selected destination (the data plane). In various exemplary embodiments, the minimal spectrum occupancy systems and methods can be implemented through the nodes 12, the servers 16, and/or the control plane 18.

RWA/RSA

Again, the general objective of the RWA or RSA problem is to maximize the number of established connections. Each connection request must be given a route and wavelength or spectrum. The RWA problem can be formally defined in an integer linear programming (ILP) and is considered to be NP-complete. RSA is more difficult than RWA as the channel width can vary for each channel (whereas RWA has fixed channel widths). The RSA problem definition is extended to mixed integer linear programming (MIP) and is considered to be NP-hard. The goals of both RWA and RSA is to minimize the blocking probability for incoming services, to maintain load balance, and to reduce the number of spectrum slots used.

Again, there are two general approaches for solving RWA. The first approach solves the routing portion first, and then assigns a wavelength second. The second approach is to consider both route selection and wavelength assignment jointly. Routing algorithms can include fixed path routing, adaptive routing, etc. For adaptive routing, this is accomplished by setting the cost of each link 14 to be cost(l)= $\beta^{usage\ (l)}$ where $\beta$ is a parameter that can be dynamically adjusted according to the traffic load, and usage (l) is the number of wavelengths in use on the link 14. A standard shortest path algorithm can then be used to find the path. Increasing the value of $\beta$ will increase the bias towards less used routes. The optimal value of can be calculated using the well-known Hill Climbing algorithm. The optimal values of $\beta$ were between 1.1 and 1.3. Wavelength assignment can include various approaches such as First Available, First Fit, Random Fit, Least Used Link, Least Used Wavelength, Most Used Link, Most Used Wavelength, Min Product, Least Loaded, Max-Sum, Relative Capacity Loss, etc.

Checkerboard Representation

Figure 2A:
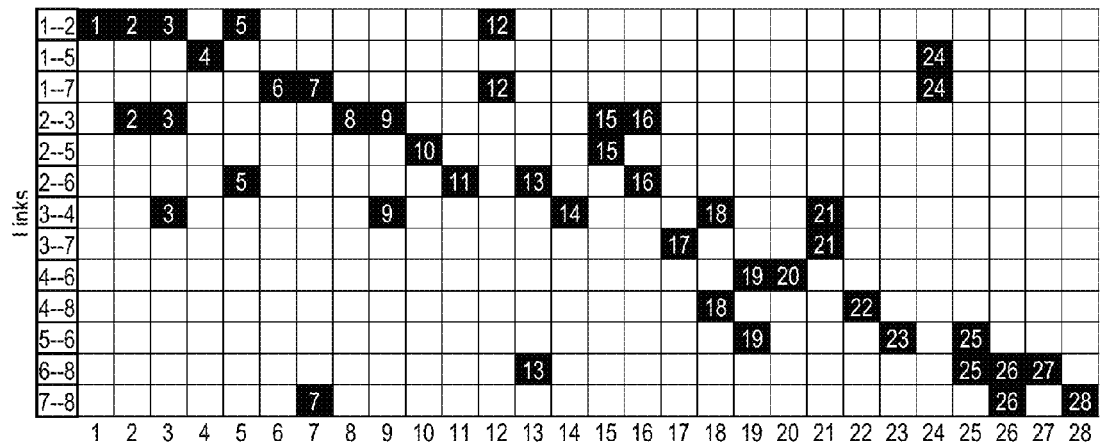
FIGS. 2A and 2B are tables of a checkerboard representation of wavelengths or spectrum on the links in the network of FIG. 1.
Figure 2B:
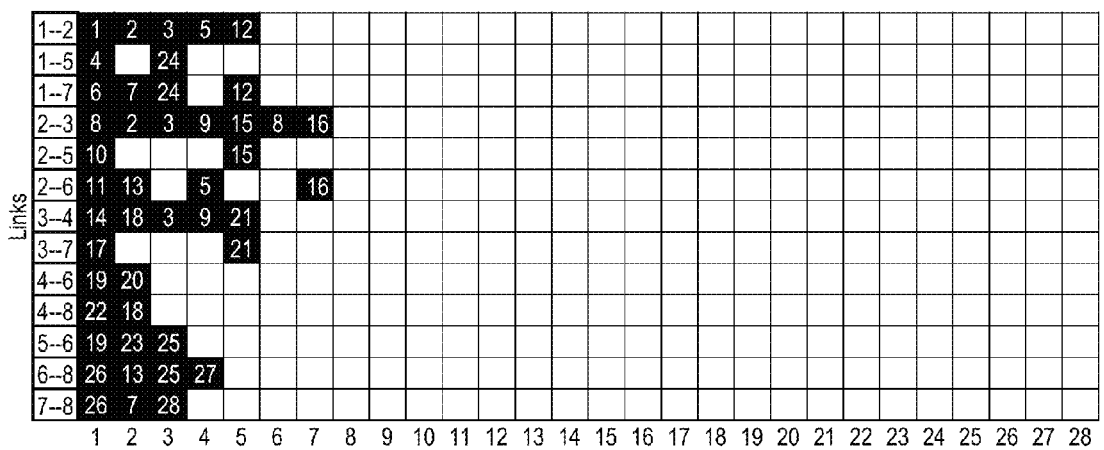

Referring to FIGS. 2A and 2B, in an exemplary embodiment, tables illustrate a checkerboard representation of wavelengths or spectrum on the links 14 in the network 10. In various exemplary embodiments, the minimal spectrum occupancy techniques and methods propose the use of the checkerboard representation for both illustrating wavelength/spectrum usage as well as for determining optimal usage. The checkerboard representation is illustrated for the network 10 and the various links 14-X-Y. Each row represents one of the links 14 For a given number of services, i.e., the spectrum is represented in a table graph with the channel slot number (wavelength or spectrum portion) represented horizontally and the network links vertically. A service is marked with its number at the crossings of its channel slot number and its traversing network links. In the exemplary checkerboard representation in FIGS. 2A and 2B, the filled in boxes represent a service (which is represented by the numbers 1-28). For example, FIG. 2A represents First Available wavelength assignment and fixed path routing, and FIG. 2B represents First Fit and fixed path routing. FIG. 2A has a spectrum efficiency of about 12% while FIG. 2B has a spectrum efficiency of about 56%.

Figure 3A:
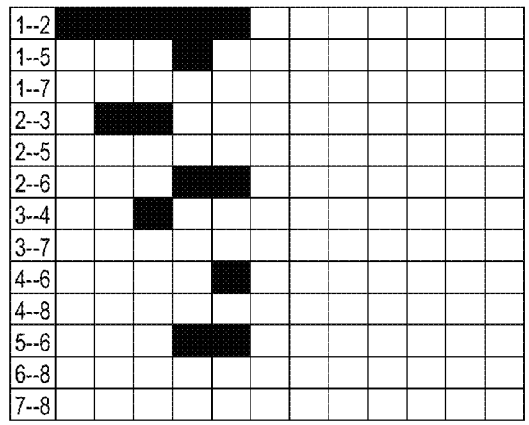
FIGS. 3A and 3B are tables of a checkerboard representation of wavelengths or spectrum on the links in the network for defining spectrum usage metrics.
Figure 3B:
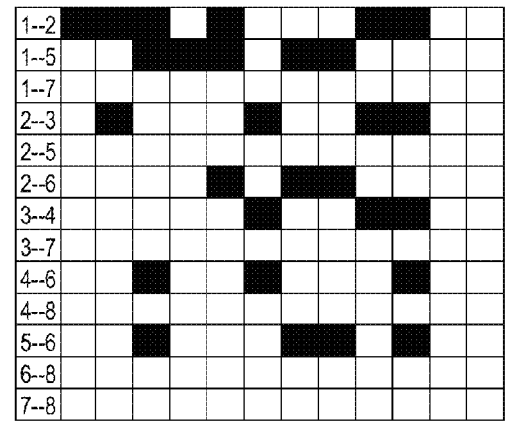

Referring to FIGS. 3A and 3B, in an exemplary embodiment, tables illustrate a checkerboard representation of wavelengths or spectrum on the links 14 in the network 10 for defining spectrum usage metrics. For the systems and methods, the spectrum usage metrics are used to determine the efficiency of a particular RWA/RSA operation. In the checkerboard representation, a first metric is Spectrum Slots (SS) which is a number of SS used. If FIG. 3A, the SS is 5, i.e., 5 columns are used, and in FIG. 3B, the SS is 10, i.e., 10 columns are used. Next, Spectrum Occupancy (SO) defines an amount of spectrum used and is defined as follows:

SO=# of pixels used/(# of wavelengths/spectrum x # of links)

where the # of pixels is the number of occupied entries in the checkboard representation, # of wavelengths/spectrum is the number of columns, and # of links in the number of rows.

In RWA, the maximum number of wavelengths is 88. In the network 10, there are 13 links (rows). FIG. 3A has 14 pixels in 5 slots, SS=5, and SO=14/(88×13)=1.22%. FIG. 3B has 28 pixels in 10 slots, SS=10, and SO=28/(88×13)= 2.44%. The SS and SO can be evaluated for each checkboard representation and used to determine the efficiency of the determination.

Binary Representation of the Checkboard Representation

Figure 4:
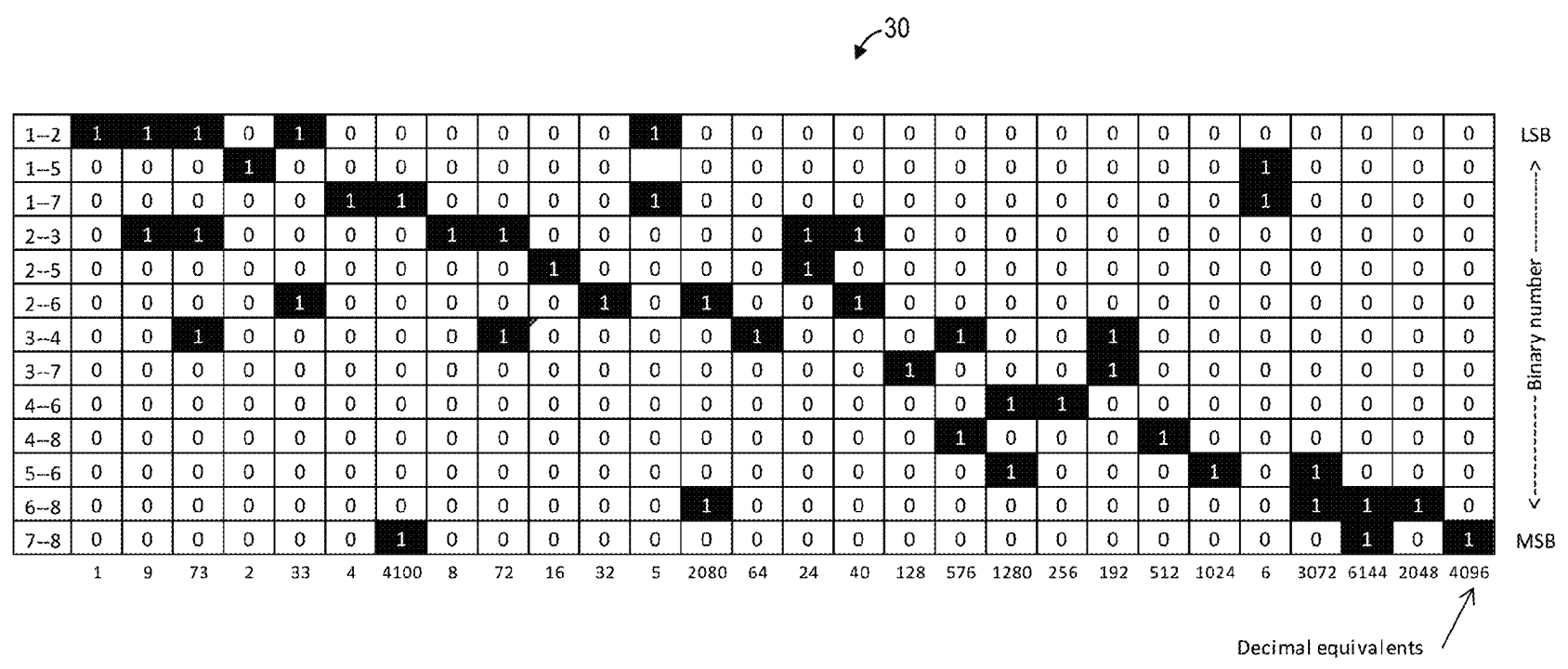

Referring to FIG. 4, in an exemplary embodiment, a table illustrates a binary representation 30 of the checkerboard representation from FIG. 2A. The binary representation 30 represents the links in one axis and spectrum slots in another axis, and the spectrum slots are wavelengths for fixed grid spacing or portions of the spectrum for flexible grid spacing. In particular, the binary representation 30 includes a "1" in each pixel where a service is provisioned and a "0" in an unoccupied service. Similar to the checkerboard representation, the binary representation 30 has the vertical axis represent the network links 14 (or optical domains), while the horizontal axis represents the spectrum slots (wavelengths or spectrum portion). Note, in fixed grid (for RWA), each column represents a wavelength. In flexible grid (for RSA), each column represents a portion of spectrum (e.g., 6.25 GHz, 12.5 GHz, etc.). Note, in fixed grid, each channel or demand only takes one column, and in flexible grid, each channel or demand can take one or more columns. This makes RSA significantly more complex than RWA, since each channel or demand can be an arbitrary number of spectrum portions, i.e., columns in the checkerboard representation and the binary representation 30.

Any vertical column represents a route from a specific source to another specific destination. If that route traverses a certain link(s), a number "1" is assigned to its pixel otherwise "0". Therefore, that route represented by a list of binary numbers its length is the same as the number of links (domains) in that network. Thus, the binary representation 30 can represent each wavelength or spectrum as a binary number, each bit in the binary number representing a link 14. With the binary representation 30, bit operations "AND," "OR," and "XNOR" (Exclusive NOR) can be performed to determine the best assignment.

Process for Determining Minimal Spectrum Occupancy

Figure 5:
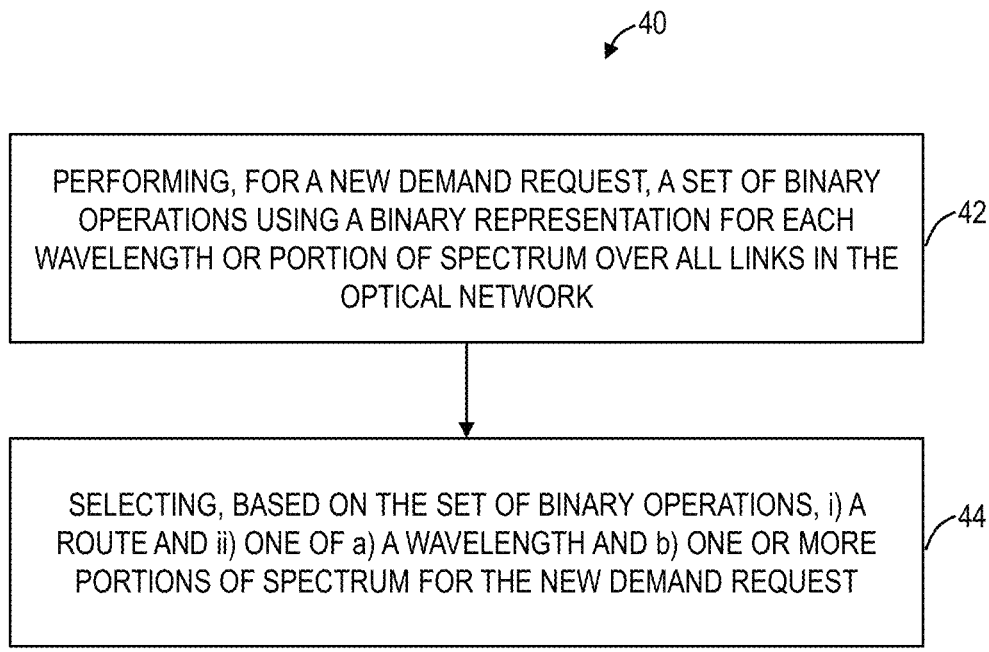
FIG. 5 is a flowchart of a process for determining minimal spectrum occupancy in an optical network, such as the network of FIG. 1.

Referring to FIG. 5, in an exemplary embodiment, a flowchart illustrates a process 40 for determining minimal spectrum occupancy in routing and wavelength/spectrum assignment in an optical network, such as the network 10. The process 40 includes performing, for a new demand request, a set of binary operations using a binary representation for each wavelength or portion of spectrum over all links in the optical network (step 42); and selecting, based on the set of binary operations, i) a route and ii) one of a) a wavelength and b) a portion spectrum for the new demand request (step 44). That is, the process 40 includes maintaining the binary representation 30 to denote occupied wavelengths or portions of spectrum in the network 10. For each new demand request, the set of binary operations is performed with the columns in the binary representation 30 to determine which wavelength or portions of the spectrum should be assigned to the new demand request.

For the new demand, all possible routes are determined by the endpoints, A-Z, in the network 10 and an associated binary representation for each of the possible routes is formed. The set of binary operations is performed between each column of the binary representation 30 and the associated binary representation for each of the possible routes. That is, the set of binary operations is performed between the binary representation of each wavelength or portion of spectrum and an associated binary representation for each possible route in the network for the new demand request. Note, since the process 40 is so computationally efficient, it is possible to simultaneous check all possible routes and wavelength/spectrum assignment. That is, an output of the process 40 selects both the route and the wavelength/spectrum.

The set of binary operations can include i) a bitwise AND to determine if a particular route for the new demand can be assigned to a particular wavelength or portion of spectrum, ii) a bitwise XNOR to distinguish each of the wavelength or portion of spectrum from one another, and iii) a bitwise OR between a selected route and a selected wavelength or portion of spectrum to update the binary representation. The set of binary operations is performed on all possible routes from every pair of source-destination of the new demand request to generate a table of results to select the best route according to a particular strategy. The binary representation represents the links in one axis and spectrum slots in another axis, wherein the spectrum slots include wavelengths for fixed grid spacing and portions of spectrum for flexible grid spacing. The links can utilize flexible grid spacing, and the set of binary operations are performed using sliding windows based on a size of the new demand request. The route and the one of the wavelength and the one or more portions of spectrum are selected simultaneously for the new demand request.

Route Determination

As part of the process 40, it is necessary to have all possible routes for each new demand request and their associated binary representation. Note, the route determination can be performed at run-time of the process 40 or ahead of time where all possible routes are predetermined. Note, the route determination can be performed ahead of time because the network 10 includes a finite number of the nodes 12, and there is a finite set of all possible routes between each of the nodes 12. Again, the process 40 is computationally efficient and works across all possible paths to find the best path from the perspective of wavelength or spectrum assignment. That is, the process 40 is finding the best route from a wavelength or spectrum utilization, not based on other path calculation techniques such as Shortest Path First (SPF) and the like.

Figure 6:
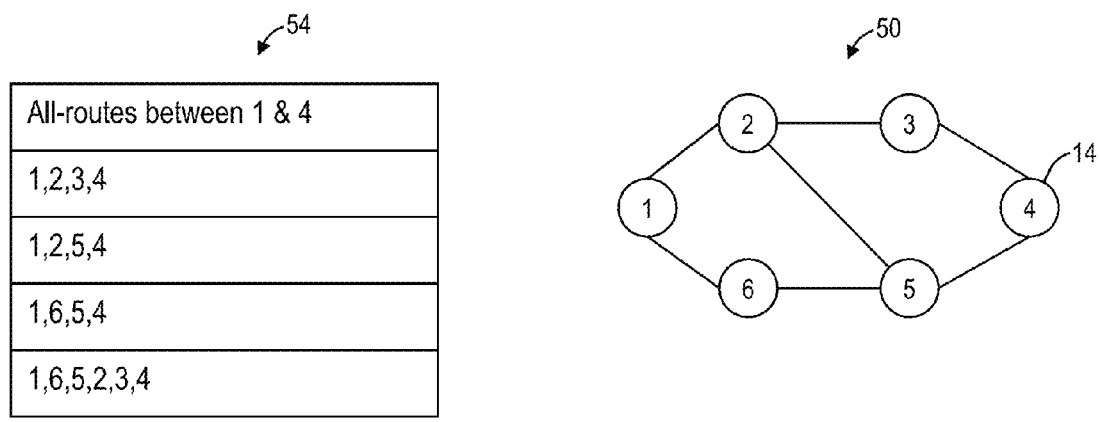
FIG. 6 is a network diagram of a network and an associated graph for determining all routes between nodes.
Figure 6:
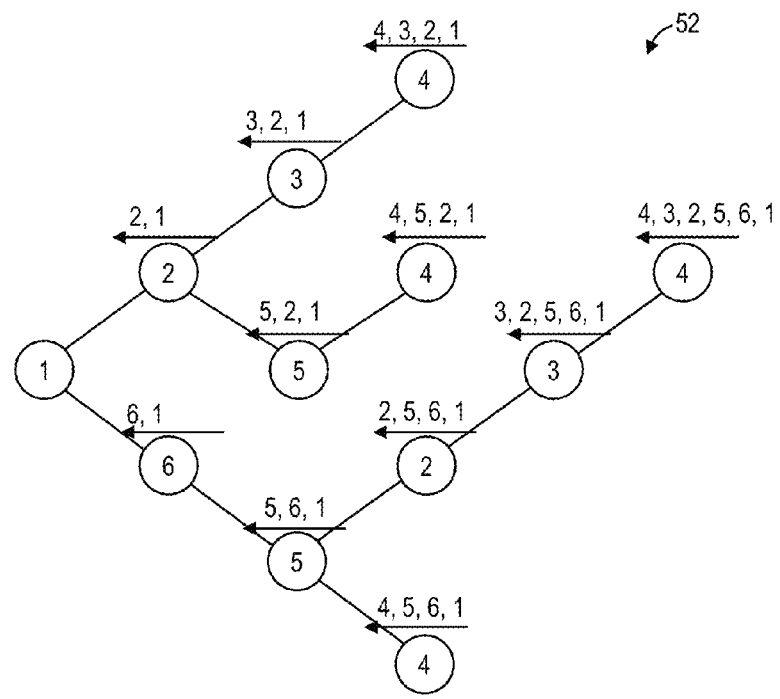

Referring to FIG. 6, in an exemplary embodiment, a network diagram illustrates a network 50 and an associated graph 52 for determining all routes between nodes 12-1, 12-4. In an exemplary embodiment, the routing component of RWA/RSA for the process 40 includes determining all routes between the two nodes associated with the new demand request. That is, the process 40 does not require a sophisticated path calculation technique to find a route. Rather, the process 40 has all routes between the nodes, A-Z, and performs the set of binary operations to determine which route and wavelength/spectrum is optimal, simultaneously. Again, the process 40 finds the route and wavelength/spectrum simultaneously. In the example of FIG. 6, the network 50 is shown as an interconnected mesh of six nodes 12, and the graph 52 shows an all-route determination between the nodes 12-1, 12-4. Note, the complexity of this route computation algorithm is O(E!), but it can be performed in advance and stored. Also, the computation only needs to be rerun when nodes 12 are added or removed from the network 50. In this example, there are four routes listed in table 54 between the nodes 12-1, 12-4. Each of these four routes has an associated binary representation. Note, there would also be associated binary representation for routes between other nodes 12. Each time a new demand request is required between the nodes 12-1, 12-4, the associated binary representation with these four routes would be used for the set of binary operations with the binary representation 30 currently representing the wavelength or spectrum usage in the network 10, 50.

Bit Operations

The set of binary operations includes a bitwise AND (referred to as an M-bit), a bitwise XNOR (Exclusive NOR) (referred to as an X-bit), and a bitwise OR. As described herein, bitwise means the associated binary representation for each route is operated with the binary representation for each wavelength or portion of spectrum. The AND operation is used to determine whether the new demand can be assigned a particular wavelength or portion of spectrum. The XNOR operation is used to determine the acceptability of a particular wavelength or portion of spectrum, when compared with each wavelength or portion of spectrum in the binary representation 30. Finally, the OR operation is used between a selected wavelength or portion of spectrum and the selected route to update the binary representation 30 for the new demand.

The AND operation is between two columns—the binary representation 30 and the associated binary representation for each route to determine if the exercised route can be provisioned in that specific spectrum or not. A value of "0" indicates that possibility and any other number shows the opposite, i.e., there is blocking. Thus, all columns and routes without a value of 0 are not valid. The XNOR operation is used to compare all of the possible routes and wavelengths/spectrum. That is, the XNOR operation is used to distinguish which of multiple wavelength or spectrum slots are best for a particular route. In an exemplary embodiment, across all X-bits, a value is chosen with the highest number of 1's in the binary representation, indicative of the most efficient use of the wavelength or spectrum. The choice of the smallest X-bit value is chosen according to a certain goal strategy (maximize the use of each spectrum slot) while the largest X-bit value choice is related to another goal strategy (balancing the load across the entire spectrum). Finally, the selected route is bitwise OR'ed with the selected slot to form its updated contents or occupancy of the binary representation 30. In an exemplary embodiment, all possible routes from every pair of source-destination can be generated, and a table of their equivalent valid X and M bits is prepared to select the best route according to a certain goal strategy.

Figure 7:
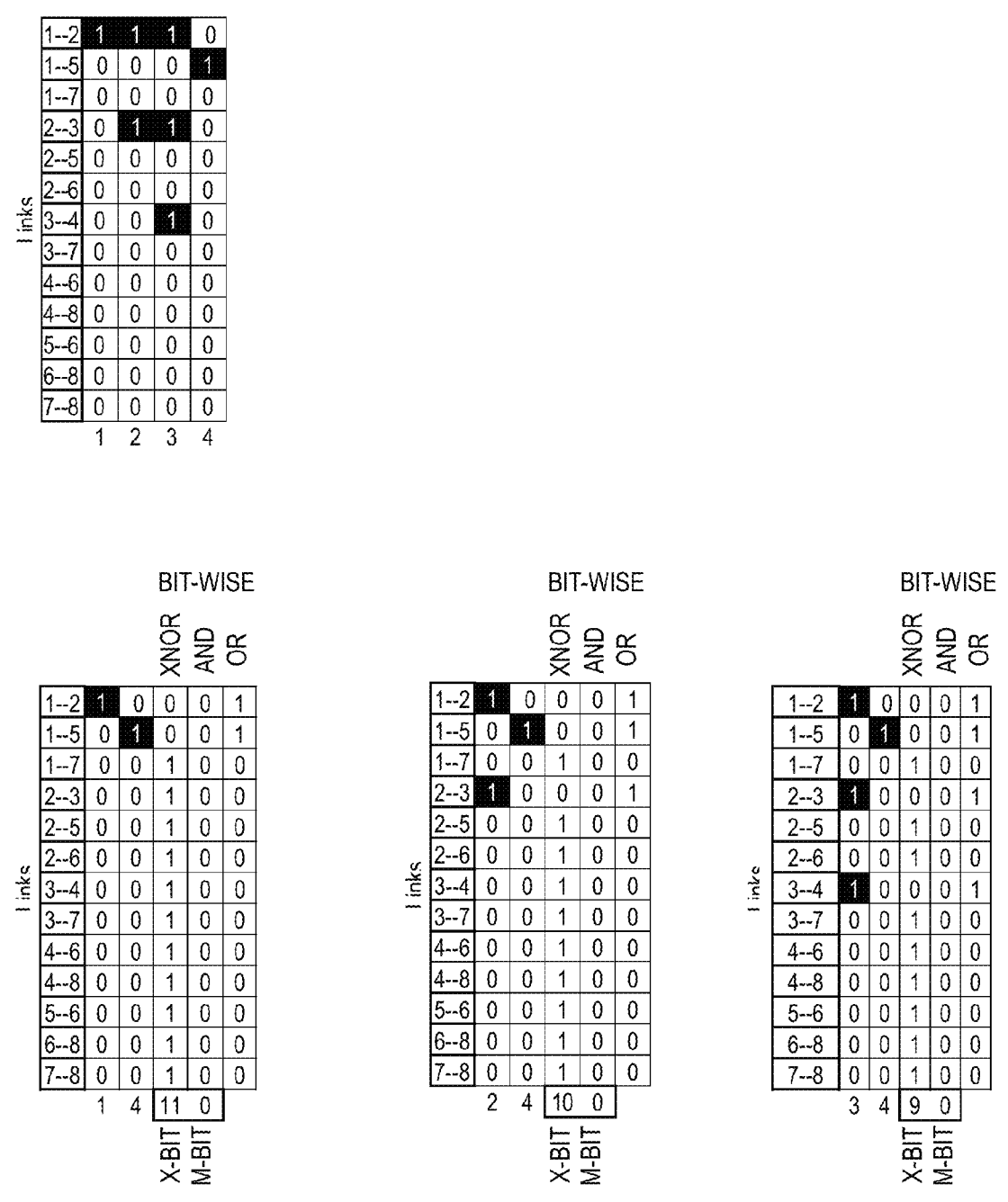

Referring to FIG. 7, in an exemplary embodiment, tables illustrate an exemplary operation of the set of bit operations. In the binary representation 30, the existing wavelengths and portions of spectrum are currently represented, such as shown in FIG. 4. In FIG. 7, the first four columns are selected for this exemplary operation. In particular, the new demand is from column 4, and the set of bit operations is performed between column 4 and columns 1, 2, 3. The AND operation shows a binary value of 0 for all three columns, i.e., it is possible to assign the new demand from the column 4 to the wavelength or spectrum in the columns 1, 2, 3. The XNOR operation has a value of 1 for each bit if both columns are 0 or 1 and a value of 0 if the columns are different. In this exemplary embodiment, the result of the XNOR operation, the X-bit, includes how many 1's are in the result. Here, the number of 1's is 11, 10, 9, respectively. Based on strategy, column 3 can be chosen, this is the densest, thus leading to the minimal overall utilization in the network.

The process 40 can include selecting the route and its spectrum assignment according to the following rules or goals, for example, 1) which has the smallest spectrum occupancy SO, i.e., the number of used pixels in the entire spectrum space (e.g., 88×number of links/domains in the network); 2) which has the smallest spectrum index in the spectrum slot numbers (e.g., 1 to 88); 3) which has the highest spectrum occupancy per spectrum slot; 4) which has the lowest weight/cost per link/domain for a cost function that may include usage, Bit Error Rate (BER) or reliability value, operating costs, etc.; and the like. That is, the aforementioned are example criteria for selecting the route and the wavelength/spectrum, based on the set of bit operations. Based on these four goals, two variants are formed; the first applied all four rules and a second applied only the first three. Again, the selected route is then bitwise OR'ed with its target spectrum slot to form its updated contents or occupancy.

Note, for initial conditions, the binary representation 30 will have values of 0 for all routes and all links. The first new demand request can, therefore, be assigned to any wavelength or spectrum. Subsequent new demand requests are then processed using the process 40 and the binary representation 30 is continually updated.

RWA/RSA Process

Figure 8:
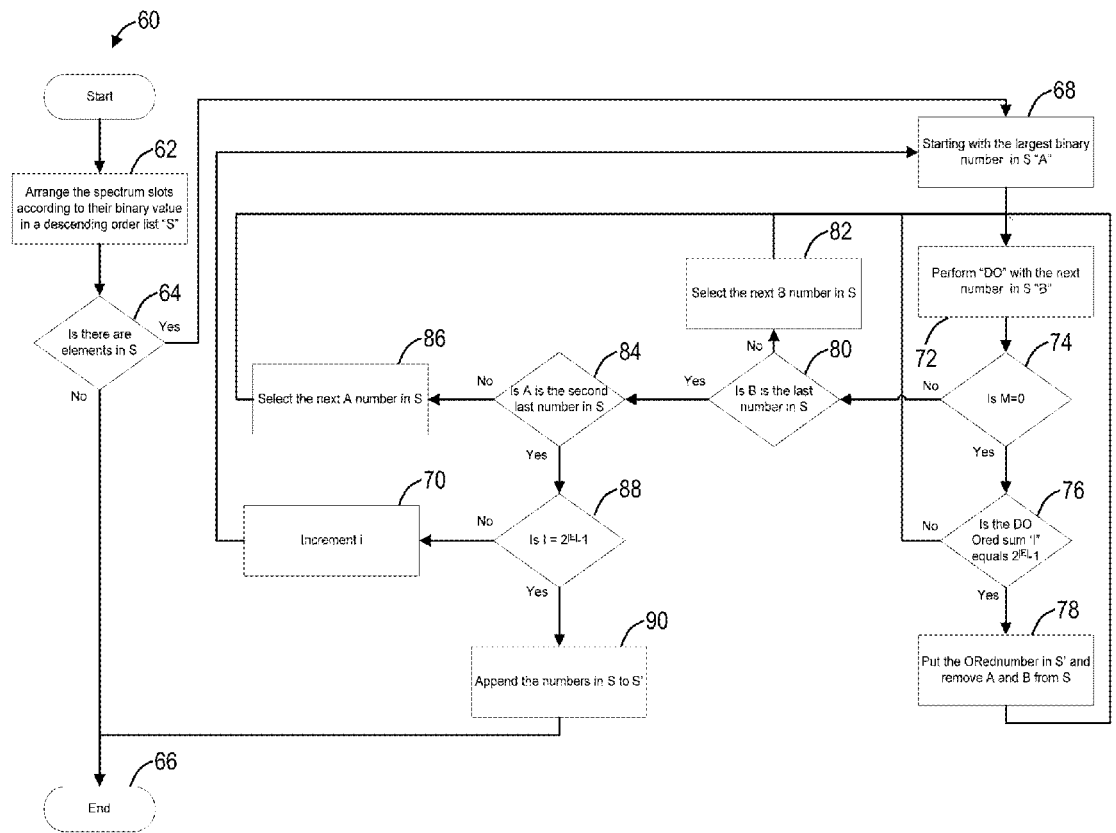
FIG. 8 is a flowchart of details of an RWA/RSA process.

Referring to FIG. 8, in an exemplary embodiment, a flowchart illustrates details of an RWA/RSA process 60. First, the spectrum slots (columns in the binary representation 30) are arranged according to their binary value in descending list, which is denoted as S (step 62). Note, in FIG. 4, the binary values are listed for each column at the bottom, i.e., 1, 9, 73, 2, . . . . If there are no elements in S (step 64), the process 60 ends (step 66). Starting with the largest binary number in S, denoted as A (step 68), and an index i is incremented (step 70), "DO" operations are performed with a next number is S, denoted as B (step 72). The "DO" operations are the set of binary operations described above, i.e., AND, XNOR, and OR operations. The M-bit has to equal 0 (step 74) as described herein. If M=0 (step 74), if the OR'ed sum equals $2^{|E|-1}$ (step 76), the OR'ed number is placed in a list S' and A and B are removed from S (step 78), else, the "DO" operations are performed with the next number in S (step 72).

If M does not equal 0 (step 74), if B is not the last number in S (step 80), the next number B is selected in S (step 82), and the "DO" operations are performed with the next number in S (step 72). If B is the last number in S (step 80), and if A is not the second to last number in S (step 84), the next number A is selected in S (step 86), and the "DO" operations are performed with the next number in S (step 72). If A is the second to last number in S (step 84) and if the OR'ed sum equals $2^{|E|-1}$ (step 88), the numbers in S are appended to S' (step 90).

Exemplary RWA Implementation

Figure 9:
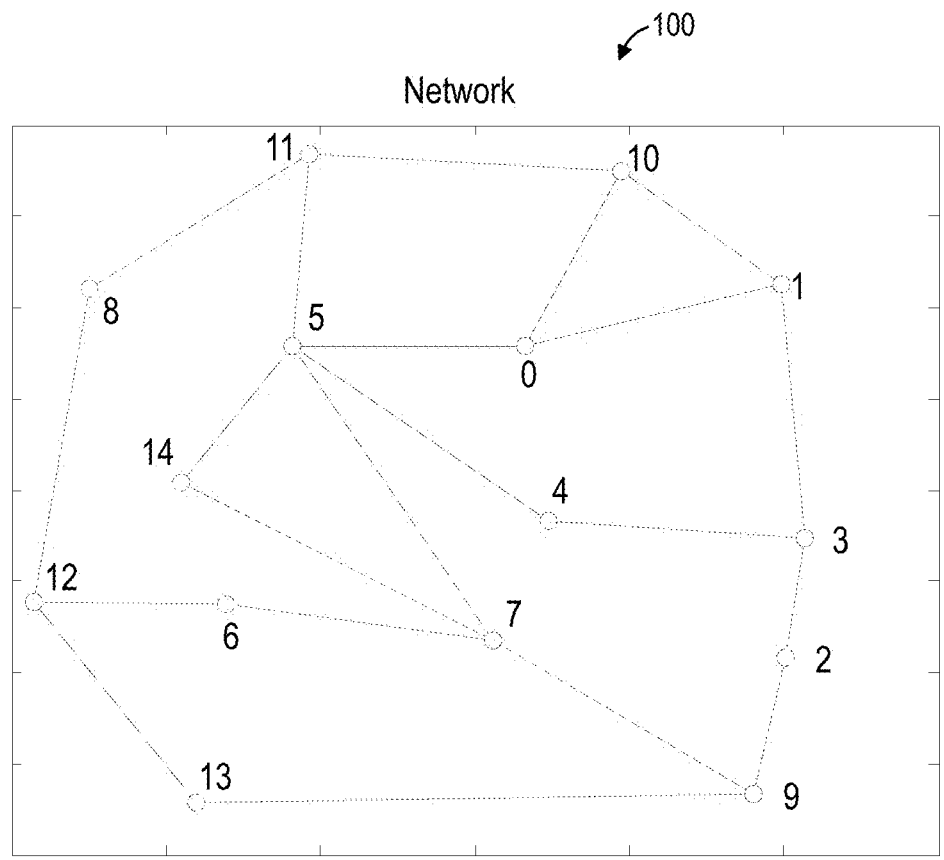
FIG. 9 is a network diagram of a network of 15 nodes which is used for illustration of an exemplary RWA implementation.
Figure 12:
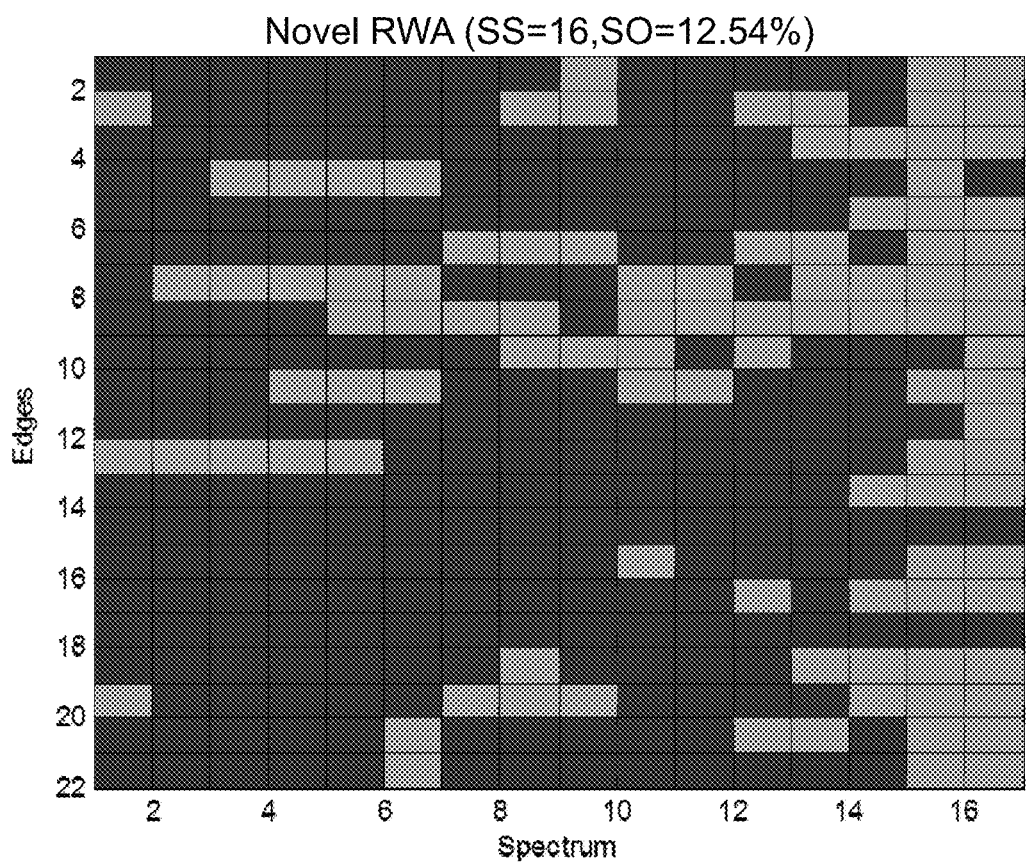
FIGS. 12-15 are various tables of checkerboard representations of different RWA techniques for the 103 services on the network of FIG. 9.
Figure 13:
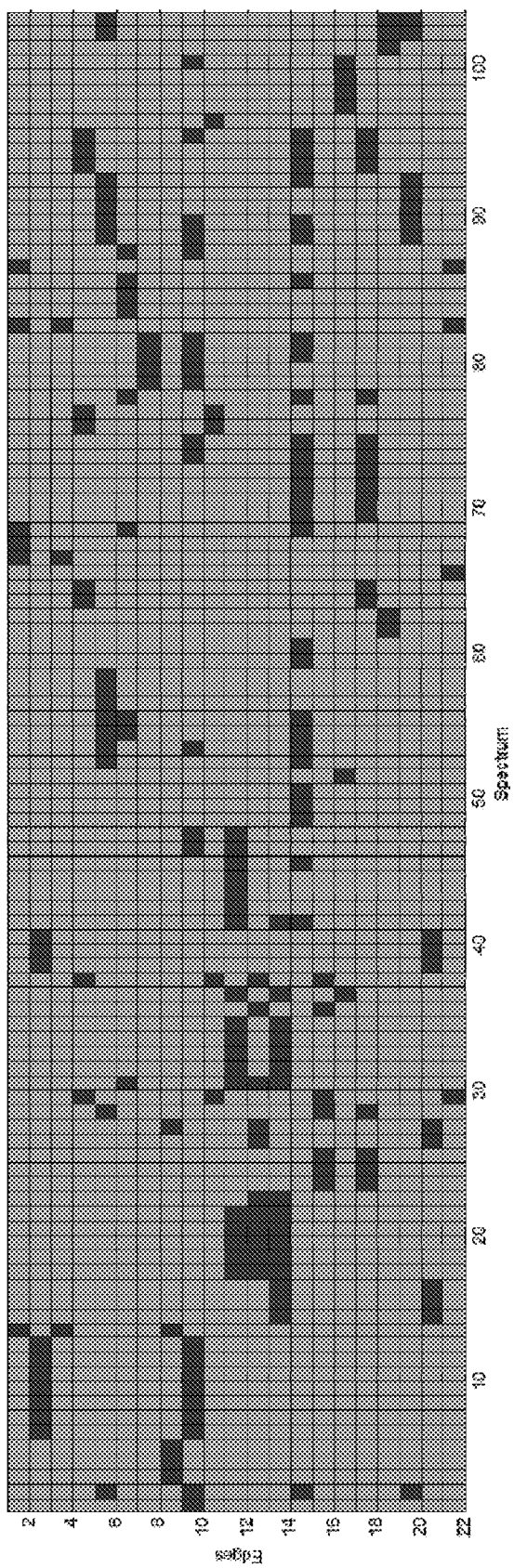
Figure 14:
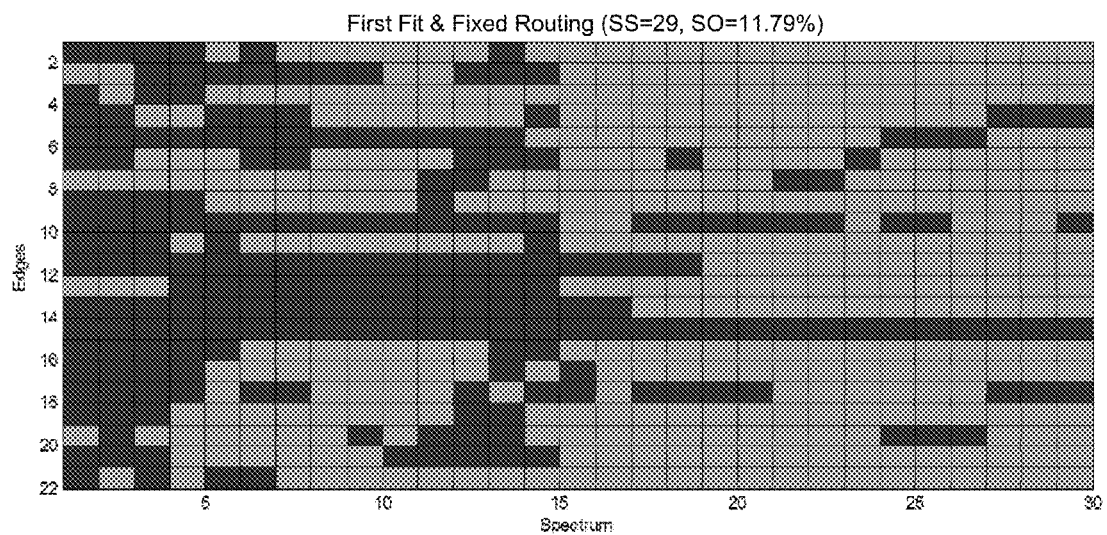
Figure 15:
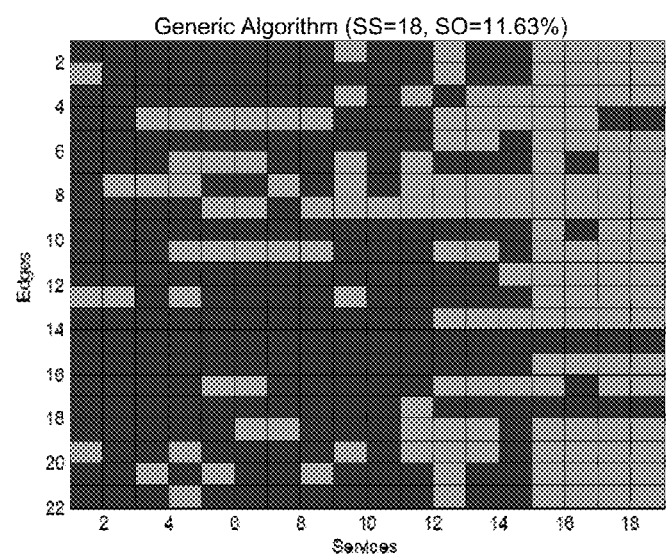

Referring to FIG. 9, in an exemplary embodiment, a network diagram illustrates a network 100 of 15 nodes which is used for illustration of an exemplary RWA implementation. Referring to FIG. 10, in an exemplary embodiment, a table illustrates all possible routes between the nodes 0, 5 in the network 100. Referring to FIG. 11, in an exemplary embodiment, a table illustrates 103 services which are added in the network 100 using the process 40. Referring to FIGS. 12-15, in exemplary embodiments, various tables illustrate checkerboard representations of different RWA techniques for the 103 services on the network 100. FIG. 12 is a checkerboard representation of the process 40 of the present disclosure, i.e., a first fit and adaptive routing technique. Note, the process 40 can perform RWA for the 103 services with SS=16, SO=12.54%, only using 16 wavelengths. FIG. 13 is a checkerboard representation of a first available and fixed routing conventional approach. Note, this conventional approach has SS=103, SO=11.53%, using 103 wavelengths. FIG. 14 is a checkerboard representation of a first fit and fixed routing conventional approach. Note, this conventional approach has SS=22, SO=11.53%, using 30 wavelengths. Finally, FIG. 15 is a checkerboard representation of a best known genetic algorithm approach. Note, this conventional approach has SS=18, SO=11.54%, using 18 wavelengths. Note, in each of FIGS. 12-15, the darker boxes indicate assigned wavelengths, and the edges represent the links in the network 100. Thus, the process 40 provides improvements over all conventional approaches, including genetic algorithms.

RSA Approach

Advantageously, the process 40 can be utilized for either fixed grid spacing or flexible grid spacing (such as described in ITU-T G.694.1 G.694.1). As described herein, in fixed grid spacing for RWA, the process 40 is adapted to select a route and a wavelength. In flexible grid spacing for RSA, the process 40 is adapted to select a route and one or more portions of spectrum. Specifically, each new demand request is for one or more portions of spectrum since there is flexible grid spacing. In the flexible grid spacing, instead of dealing with a binary number for the binary representation which represents one of the targeted routes, flexible grid deals with a group or block of binary numbers. The same binary operations are applied to that block, and a sliding window is used to do the match and search operations. The window has the same width of the routing block, and it is rolled over all of the spectrum slices. For example, with each portion of spectrum with 6.25 GHz resolution, there are 768 spectrum slices, with 12.5 GHz resolution, there are 384 spectrum slices, etc. In an exemplary embodiment, for the flexible DWDM grid, the allowed frequency slots have a nominal central frequency (in THz) defined by: 193.1+n×0.00625 where n is a positive or negative integer including 0 and 0.00625 is the nominal central frequency granularity in THz, and the slot width is defined by: 12.5×m where m is a positive integer, and 12.5 is the slot width granularity in GHz. Any combination of frequency slots is allowed as long as no two frequency slots overlap.

The following table illustrates some exemplary modulation schemes and associated slots required in the flexible grid spacing:

| Modulation scheme | Bandwidth | Slots |
|---|---|---|
| 10 G Intensity Modulation (IM)-Direct Detection (DD) (10.7 GBaud) | 12.5 GHz | M = 1 |
| 40 G Dual-Polarization Quadrature Phase-Shift Keying (DP-QPSK) (11.5 Gbaud) | 25 GHz | 2 |
| 40 G Dual-Polarization Binary Phase-Shift Keying DP-BPSK (11.5 Gbaud) | 25 GHz | 2 |
| 100 G DP-QPSK (14.4 Gbaud) | 37.5 GHz | 3 |
| 50 G DP-BPSK (35 Gbaud) | 37.5 GHz | 3 |
| 100 G DP-16QAM (Quadrature Amplitude Modulation) (17.5 Gbaud) | 20 GHz | 2 |
| 100 G DP-QPSK (35 Gbaud) | 37.5 GHz | 3 |
| 200 DP-16QAM (35 Gbaud) | 40 GHz | 4 |

Figure 16:
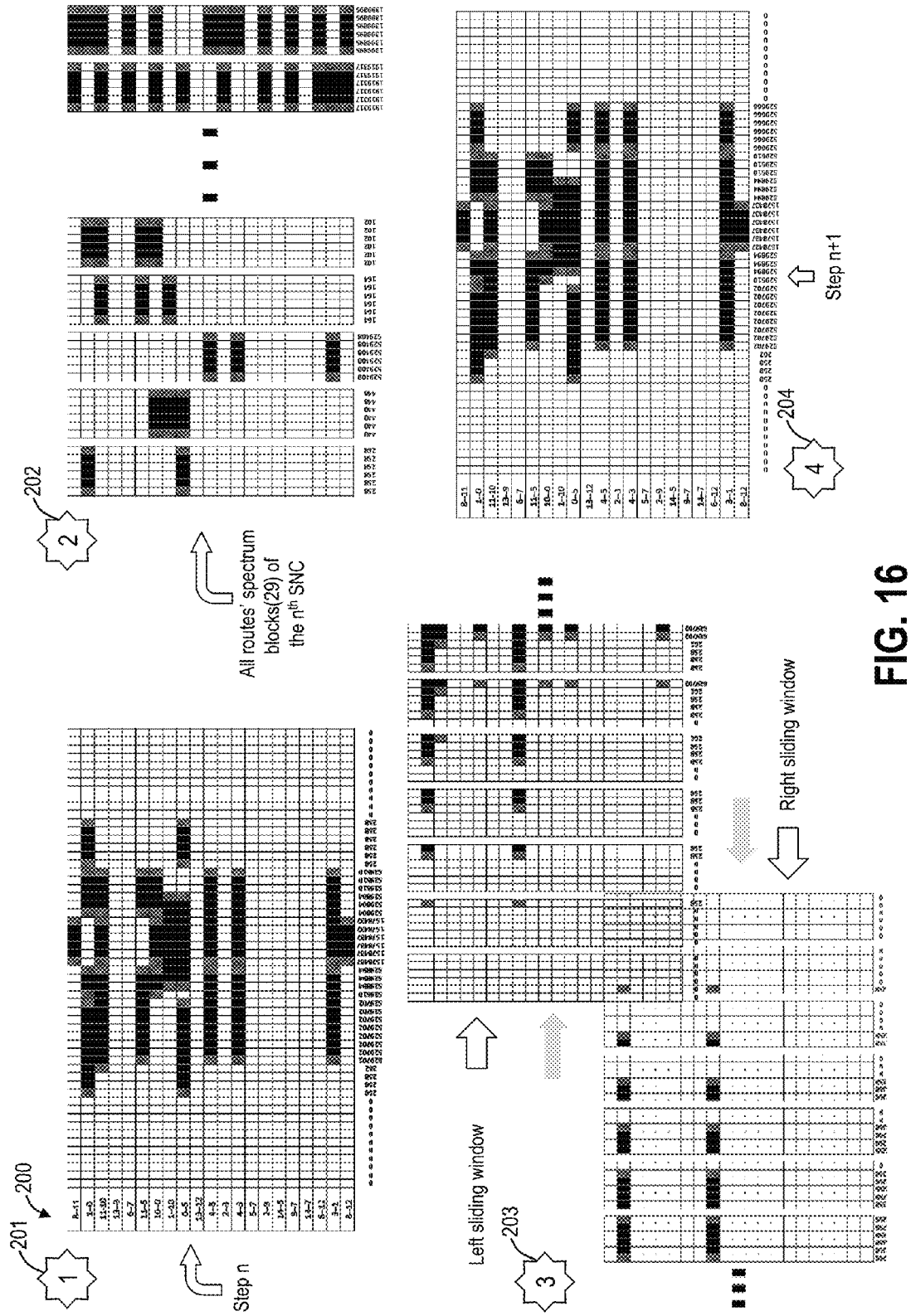
FIG. 16 is a diagram of an RSA process for implementing a sliding window with the process of FIG. 5 to support the flexible grid spacing.

Referring to FIG. 16, in an exemplary embodiment, a diagram illustrates an RSA process 200 for implementing a sliding window with the process 40 to support the flexible grid spacing. Specifically, the process 200 can be generalized in four steps 201, 202, 203, 204. In step 201, all possible routes are generated as a block of pixels with a height equal to the number of links/domains and a width equal to a demand capacity of the new demand request as multiples of the spectrum slot width. The different routes are sorted in ascending order according to their spectrum occupancy in step 202. The set of binary operations is carried between every spectrum block and a sliding window of the same spectrum size in step 203. The best-chosen route block is then bitwise OR'ed with its target spectrum in step 204.

Figure 17:
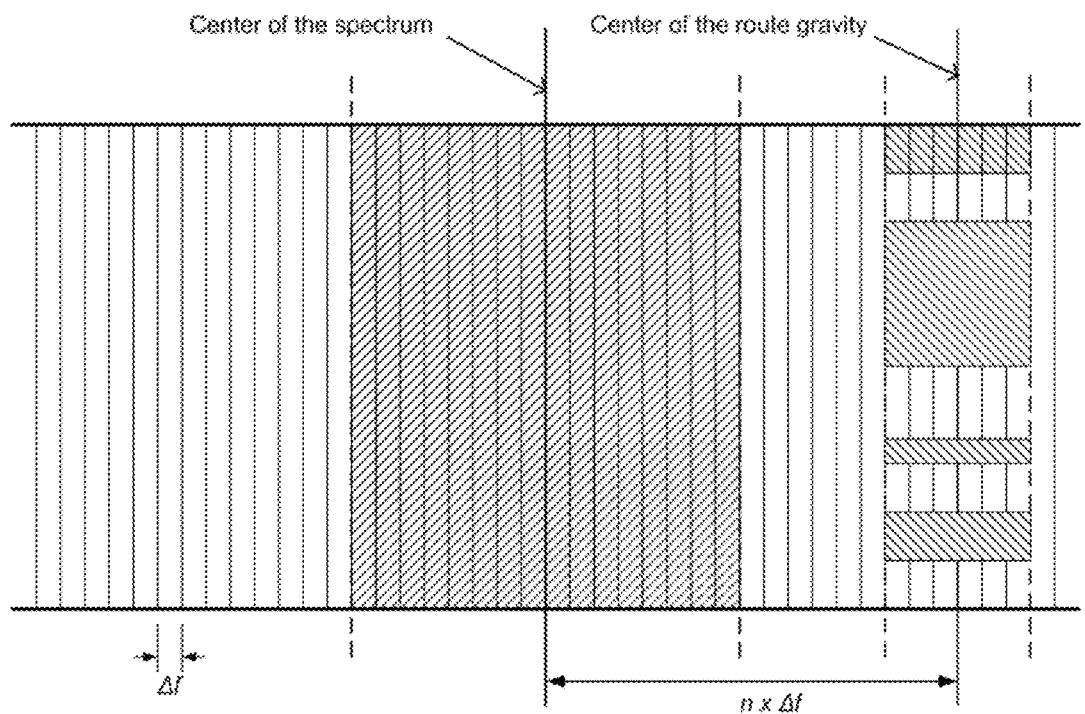
FIG. 17 is a diagram of route torque for selecting in the process.

Referring to FIG. 17, in an exemplary embodiment, a diagram illustrates route torque for selecting in the process 200. Specifically, Route Torque (RT) equals:

$$RT = A * m^{n*\Delta f}$$

where A is the route area, m=]1, $N_l$], and where $N_l$ is the number of links. For m >$N_l$, there can be a strict selection rule for the route which is the closest to the center of the spectrum. Also, selection can be based on a centroid of a non-self-intersecting closed polygon defined by n vertices $(x_0,y_0)$, $(x_1,y_1)$, . . . , $(x_{n-1},y_{n-1})$ is the point $(C_x, C_y)$, where $$C_x = \frac{1}{6A} \sum_{i=0}^{n-1} (x_i + x_{i+1})(x_i y_{i+1} - x_{i+1} y_i)$$

$$C_y = \frac{1}{6A} \sum_{i=0}^{n-1} (y_i + y_{i+1})(x_i y_{i+1} - x_{i+1} y_i)$$

and where A is the polygon's signed area, $$A = \frac{1}{2} \sum_{i=0}^{n-1} (x_i y_{i+1} - x_{i+1} y_i)$$

Figure 18:
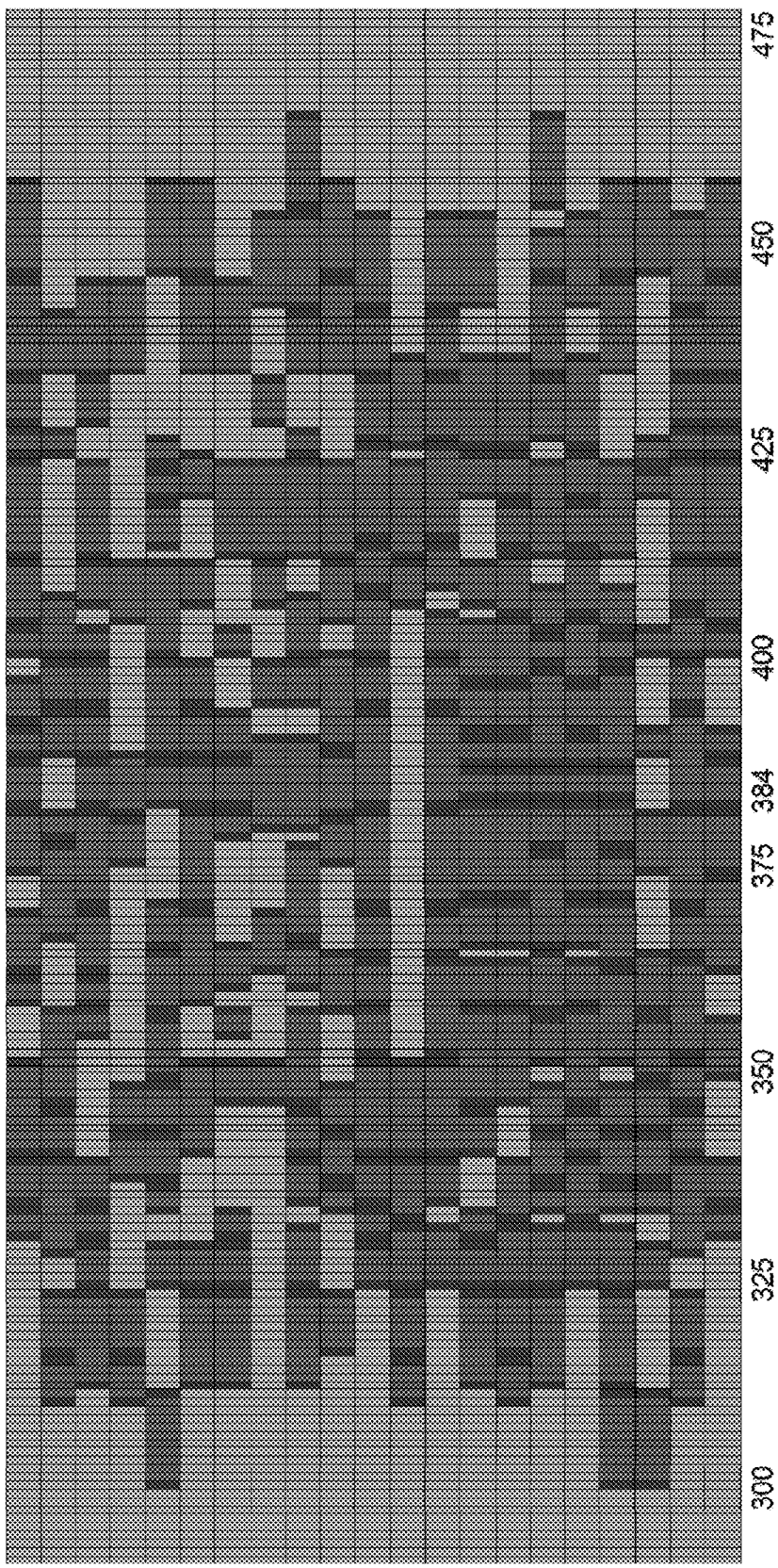
FIGS. 18 and 19 are tables of checkerboard representations of the RSA process of FIG. 12 in an exemplary operation (FIG. 18) compared to a conventional first fit and adaptive routing technique (FIG. 19)
Figure 19:
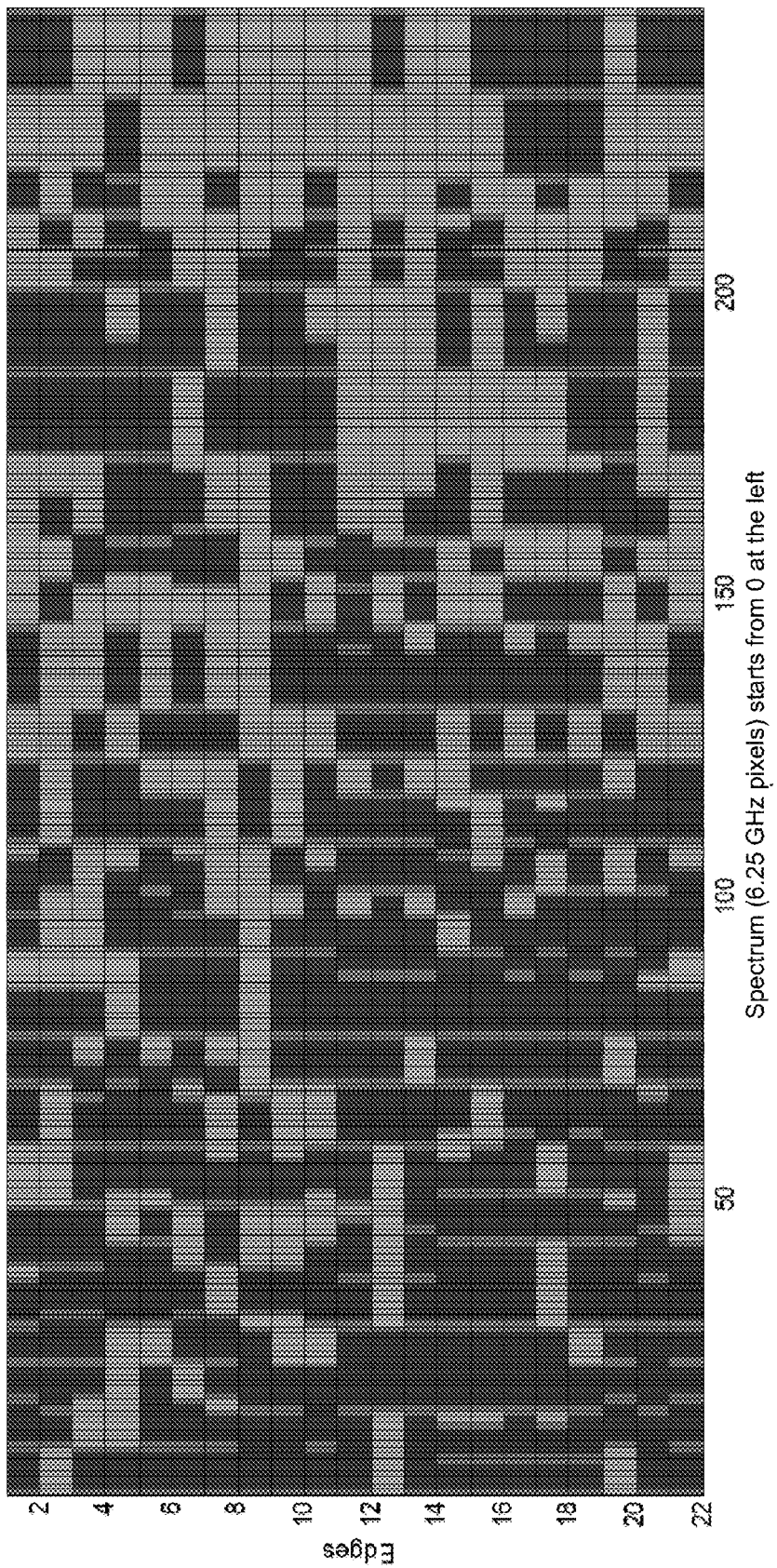
Figure 20:
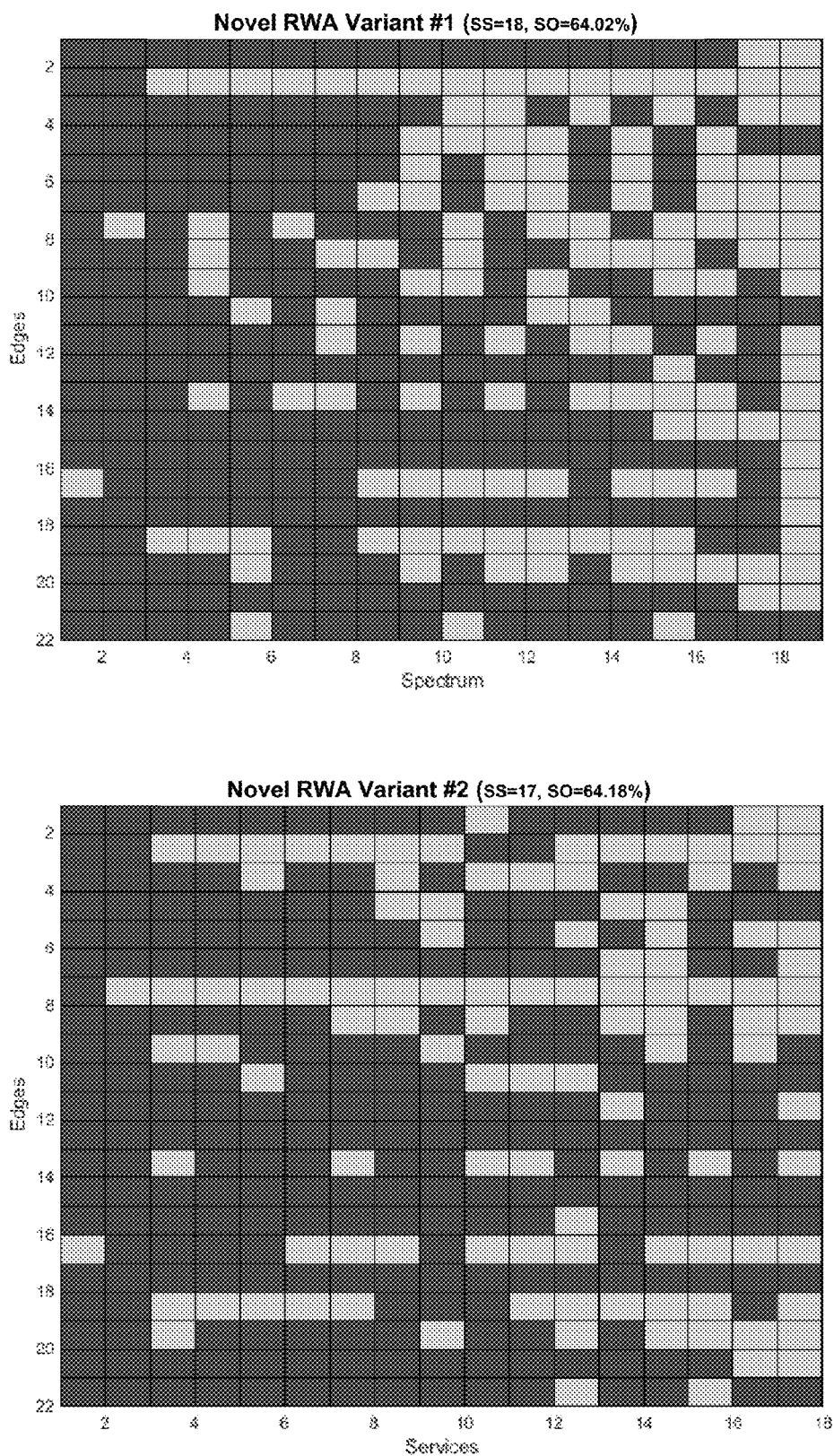
FIGS. 20-24 are tables of the checkerboard representations for an exemplary operation with 100 (FIG. 20), 200 (FIG. 21), 300 (FIG. 22), 400 (FIG. 23), and 500 (FIG. 24) connections.
Figure 21:
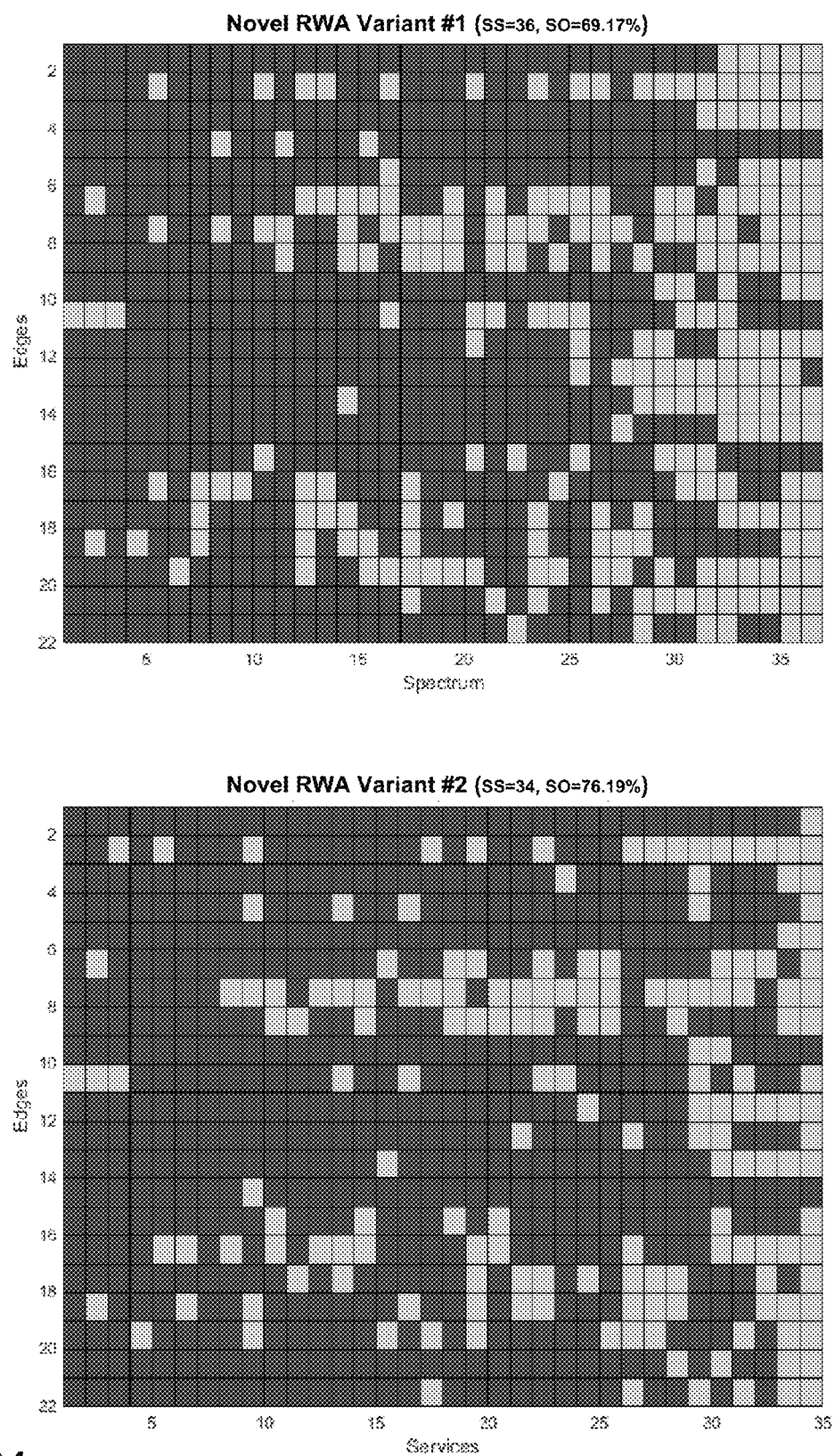
Figure 22:
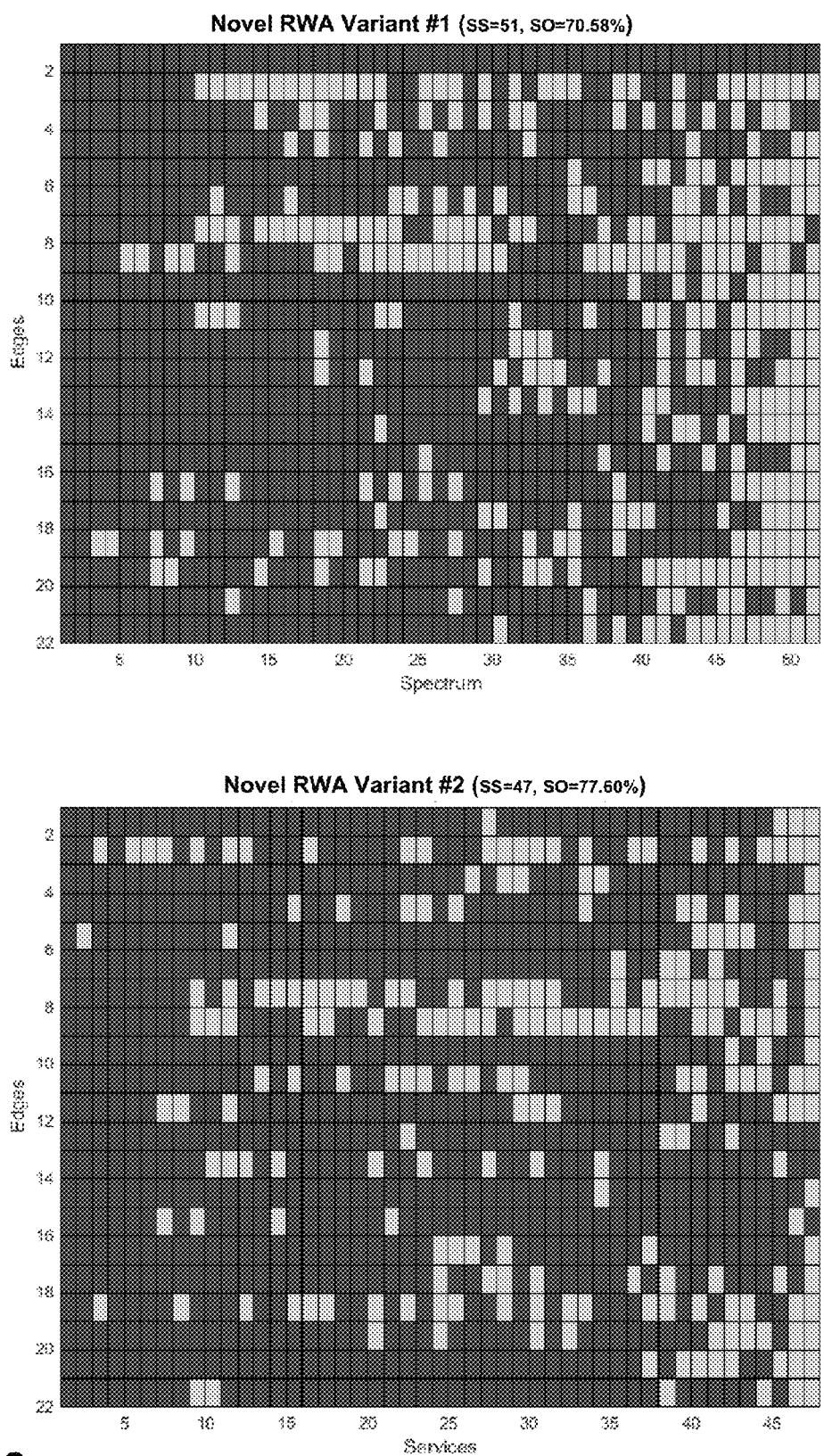
Figure 23:
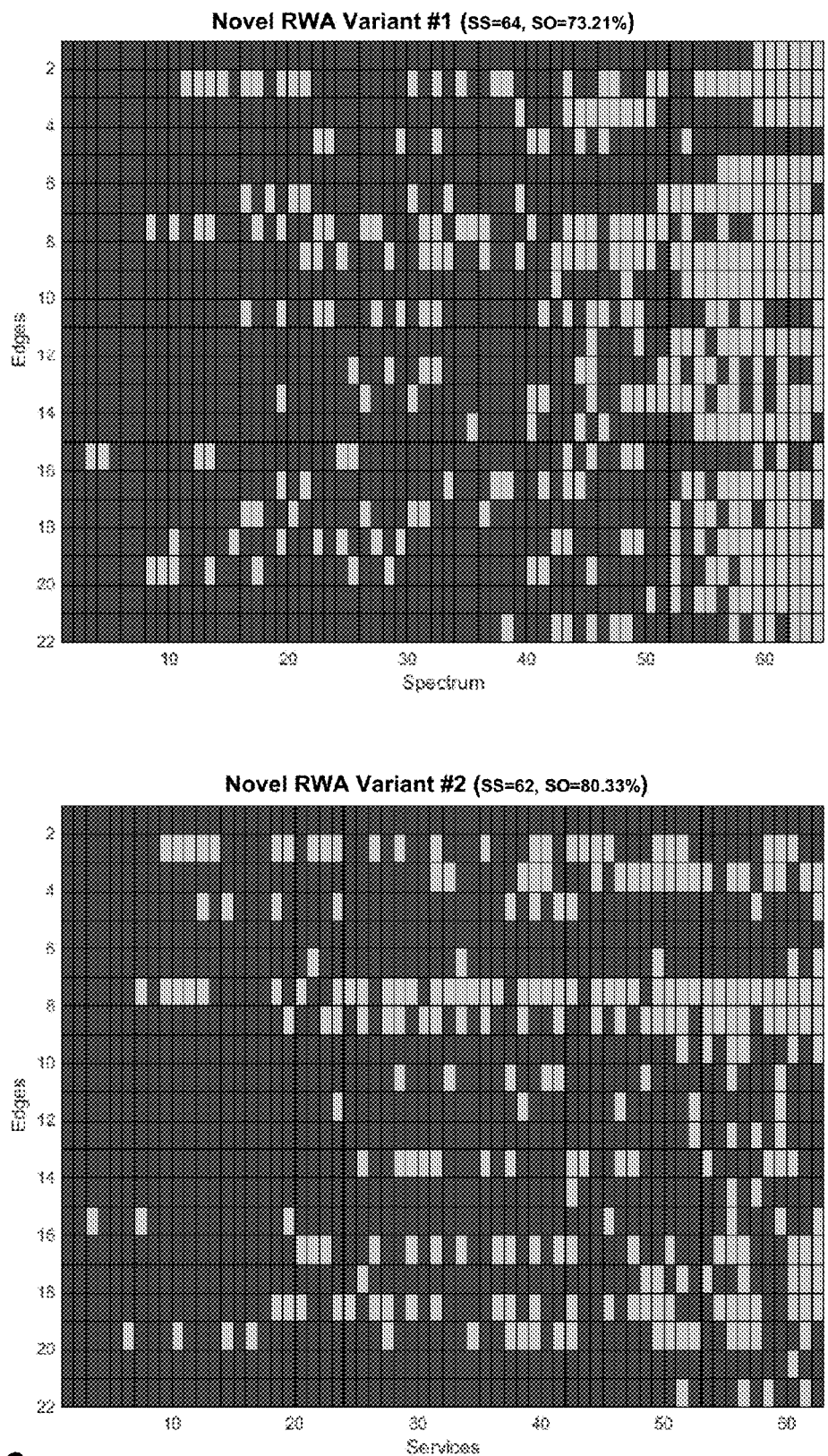
Figure 24:
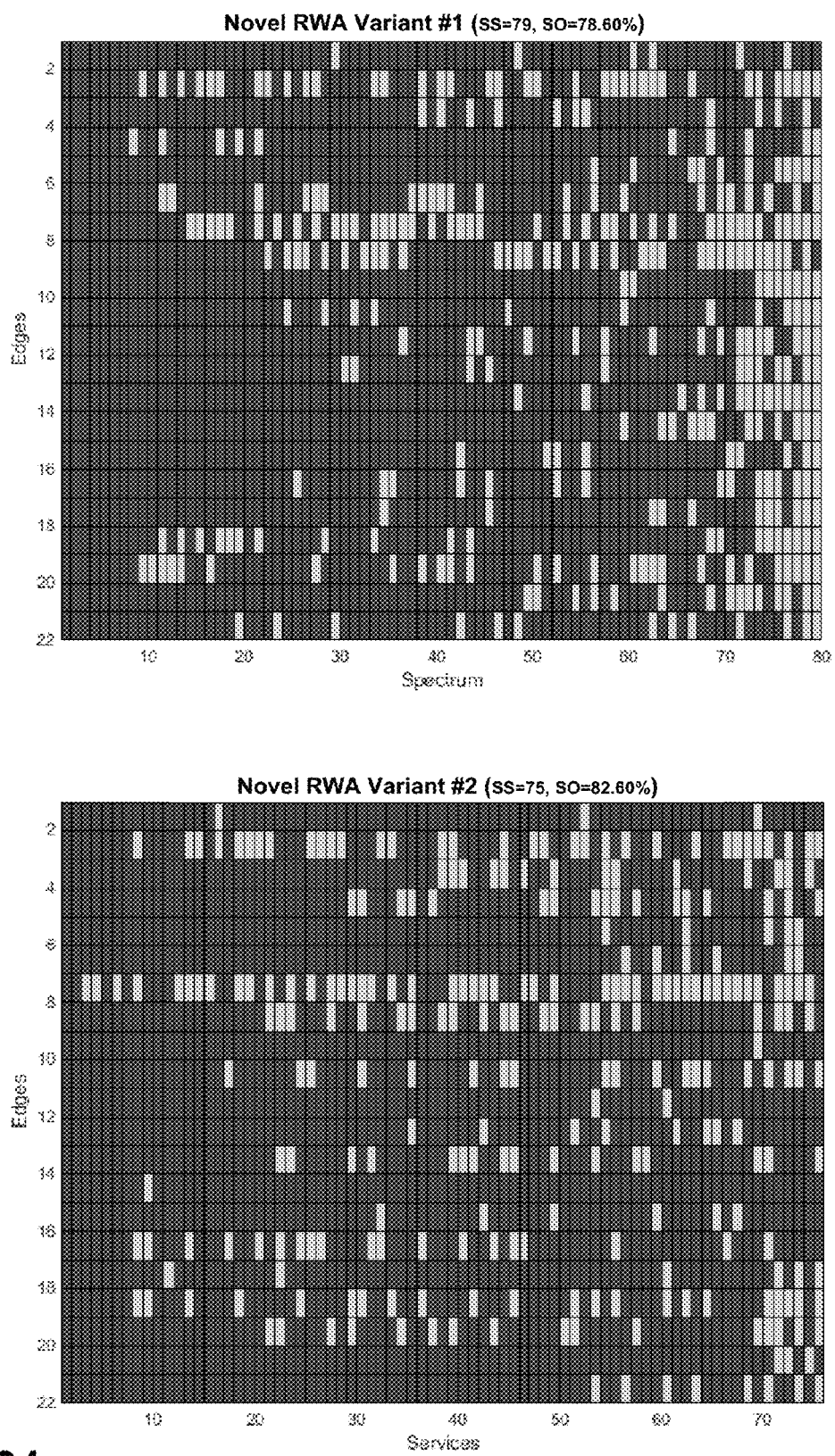

Referring to FIGS. 18 and 19, in an exemplary embodiment, various tables illustrate checkerboard representations of the RSA process 200 (FIG. 18) compared to a conventional first fit and adaptive routing technique (FIG. 19). Note, the RSA process 200, implementing the process 40, packs spectrum usage in the middle of the spectrum, much more efficiently than the conventional first fit and adaptive routing technique.

Exemplary Implementation—100, 200, 300, 400, and 500 Connections

Referring to FIGS. 20-24, in various exemplary embodiments, tables illustrate the checkerboard representations for an exemplary operation with 100 (FIG. 20), 200 (FIG. 21), 300 (FIG. 22), 400 (FIG. 23), and 500 (FIG. 24) connections. Each of FIGS. 20-24 compares the two novel RWA variants; all four goals of the target function—Variant #1 (on top) and the only first three goals of the target function—Variant #2 (on the bottom).

Exemplary Server

Figure 25:
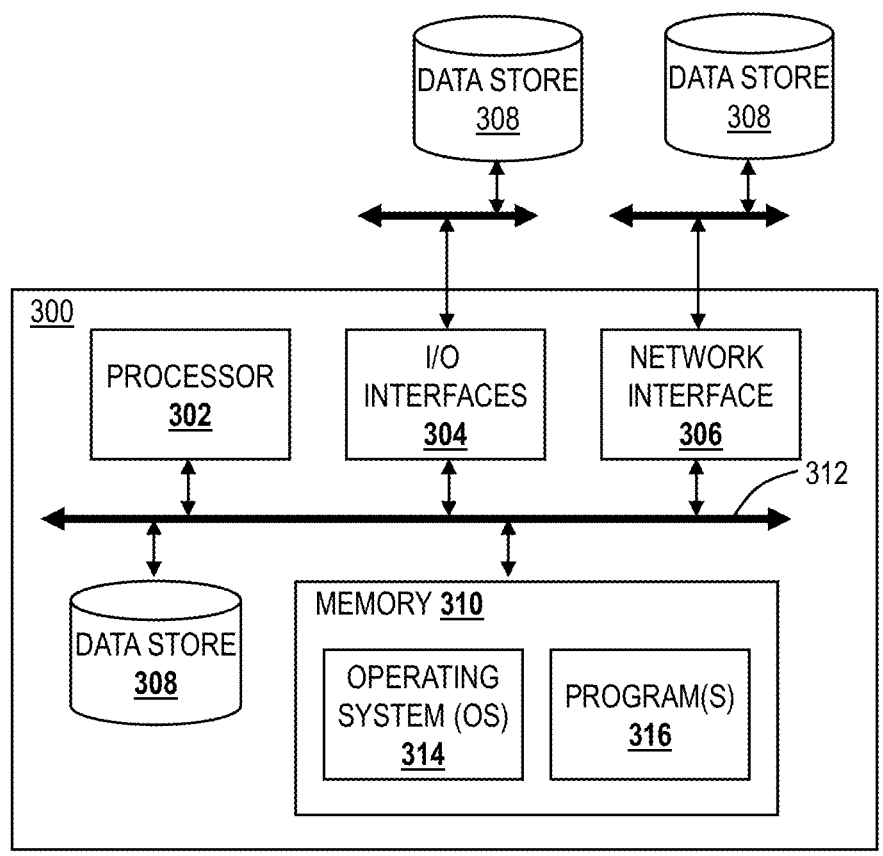
FIG. 25 is a block diagram of a server such as for the servers in the network of FIG. 1, for a processing device to implement a control plane, for a Software Defined Networking (SDN) controller, a Path Computation Element (PCE), etc.

Referring to FIG. 25, in an exemplary embodiment, a block diagram illustrates a server 300 such as for the servers 16, for a processing device to implement the control plane 18, for an SDN controller, a PCE, etc. The server 300 can be a digital computer that, in terms of hardware architecture, generally includes a processor 302, input/output (I/O) interfaces 304, a network interface 306, a data store 308, and memory 310. It should be appreciated by those of ordinary skill in the art that FIG. 25 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 can include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 can be used to receive user input from and/or for providing system output to one or more devices or components. User input can be provided via, for example, a keyboard, touchpad, and/or a mouse. System output can be provided via a display device and a printer (not shown). I/O interfaces 304 can include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 306 can be used to enable the server 300 to communicate on a network. The network interface 306 can include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 can include address, control, and/or data connections to enable appropriate communications on the network. A data store 308 can be used to store data. The data store 308 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 can incorporate electronic, magnetic, optical, and/or other types of storage media. In one example, the data store 308 can be located internal to the server 300 such as, for example, an internal hard drive connected to the local interface 312 in the server 300. Additionally, in another embodiment, the data store 308 can be located external to the server 300 such as, for example, an external hard drive connected to the I/O interfaces 304 (e.g., SCSI or USB connection). In a further embodiment, the data store 308 can be connected to the server 300 through a network, such as, for example, a network attached file server.

The memory 310 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 can incorporate electronic, magnetic, optical, and/or other types of storage media. Note that the memory 310 can have a distributed architecture, where various components are situated remotely from one another, but can be accessed by the processor 302. The software in memory 310 can include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

In an exemplary embodiment, an apparatus adapted to determine minimal spectrum occupancy in routing and wavelength/spectrum assignment (RWA/RSA) in an optical network includes circuitry adapted to perform, for a new demand request, a set of binary operations using a binary representation for each wavelength or portion of spectrum over the plurality of links, and circuitry adapted to select, based on the set of binary operations, i) a route and ii) one of a) a wavelength and b) one or more portions of spectrum for the new demand request.

In another exemplary embodiment, a system adapted to determine minimal spectrum occupancy in routing and wavelength/spectrum assignment (RWA/RSA) in an optical network includes a processor; and memory storing instructions that, when executed, cause the processor to perform, for a new demand request, a set of binary operations using a binary representation for each wavelength or portion of spectrum over all links in the optical network, and select, based on the set of binary operations, i) a route and ii) one of a) a wavelength and b) one or more portions of spectrum for the new demand request.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for determining minimal spectrum occupancy in routing and wavelength/spectrum assignment (RWA/RSA) in an optical network, the method comprising:
performing, for a new demand request, a set of binary operations using a binary representation for each wavelength or portion of spectrum over all links in the optical network where each bit represents a channel or portion of spectrum and is set based on occupancy therein; and
selecting, based on the set of binary operations, i) a route and ii) one of a) a wavelength and b) one or more portions of spectrum for the new demand request.

2. The method of claim 1, wherein the set of binary operations is performed between the binary representation for each wavelength or portion of spectrum and an associated binary representation for each possible route in the network for the new demand request.

3. The method of claim 1, wherein the set of binary operations comprise i) a bitwise AND to determine if a particular route for the new demand can be assigned to a particular wavelength or portion of spectrum, ii) a bitwise XNOR to distinguish each of the wavelength or portion of spectrum from one another, and iii) a bitwise OR between a selected route and a selected wavelength or portion of spectrum to update the binary representation.

4. The method of claim 1, wherein the set of binary operations is performed on all possible routes from every pair of source-destination of the new demand request to generate a table of results to select a best route according to a particular strategy.

5. The method of claim 1, wherein the binary representation represents the links in one axis and spectrum slots in another axis, wherein the spectrum slots comprise wavelengths for fixed grid spacing and portions of spectrum for flexible grid spacing.

6. The method of claim 1, wherein the links utilize flexible grid spacing, and wherein the set of binary operations are performed using a sliding windows based on a size of the new demand request.

7. The method of claim 1, wherein the route and the one of the wavelength and the one or more portions of spectrum are selected simultaneously for the new demand request.

8. An apparatus adapted to determine minimal spectrum occupancy in routing and wavelength/spectrum assignment (RWA/RSA) in an optical network, the apparatus comprising:
circuitry adapted to perform, for a new demand request, a set of binary operations using a binary representation for each wavelength or portion of spectrum over all links in the optical network where each bit represents a channel or portion of spectrum and is set based on occupancy therein, and
circuitry adapted to select, based on the set of binary operations, i) a route and ii) one of a) a wavelength and b) one or more portions of spectrum for the new demand request.

9. The apparatus of claim 8, wherein the set of binary operations is performed between the binary representation for each wavelength or portion of spectrum and an associated binary representation for each possible route in the network for the new demand request.

10. The apparatus of claim 8, wherein the set of binary operations comprise i) a bitwise AND to determine if a particular route for the new demand can be assigned to a particular wavelength or portion of spectrum, ii) a bitwise XNOR to distinguish each of the wavelength or portion of spectrum from one another, and iii) a bitwise OR between a selected route and a selected wavelength or portion of spectrum to update the binary representation.

11. The apparatus of claim 8, wherein the set of binary operations is performed on all possible routes from every pair of source-destination of the new demand request to generate a table of results to select a best route according to a particular strategy.

12. The apparatus of claim 8, wherein the binary representation represents the links in one axis and spectrum slots in another axis, wherein the spectrum slots comprise wavelengths for fixed grid spacing and portions of spectrum for flexible grid spacing.

13. The apparatus of claim 8, wherein the links utilize flexible grid spacing, and wherein the set of binary operations are performed using a sliding windows based on a size of the new demand request.

14. The apparatus of claim 8, wherein the route and the one of the wavelength and the one or more portions of spectrum are selected simultaneously for the new demand request.

15. A system adapted to determine minimal spectrum occupancy in routing and wavelength/spectrum assignment (RWA/RSA) in an optical network, the system comprising:
a processor; and
memory storing instructions that, when executed, cause the processor to
perform, for a new demand request, a set of binary operations using a binary representation for each wavelength or portion of spectrum over all links in the optical network where each bit represents a channel or portion of spectrum and is set based on occupancy therein, and
select, based on the set of binary operations, i) a route and ii) one of a) a wavelength and b) one or more portions of spectrum for the new demand request.

16. The system of claim 15, wherein the set of binary operations is performed between the binary representation for each wavelength or portion of spectrum and an associated binary representation for each possible route in the network for the new demand request.

17. The system of claim 15, wherein the set of binary operations comprise i) a bitwise AND to determine if a particular route for the new demand can be assigned to a particular wavelength or portion of spectrum, ii) a bitwise XNOR to distinguish each of the wavelength or portion of spectrum from one another, and iii) a bitwise OR between a selected route and a selected wavelength or portion of spectrum to update the binary representation.

18. The system of claim 15, wherein the set of binary operations is performed on all possible routes from every pair of source-destination of the new demand request to generate a table of results to select a best route according to a particular strategy.

19. The system of claim 15, wherein the binary representation represents the links in one axis and spectrum slots in another axis, wherein the spectrum slots comprise wavelengths for fixed grid spacing and portions of spectrum for flexible grid spacing.

20. The system of claim 15, wherein the links utilize flexible grid spacing, and wherein the set of binary operations are performed using a sliding windows based on a size of the new demand request.

* * * * *